(12) United States Patent
Kashiwagi

(10) Patent No.: US 7,898,586 B2
(45) Date of Patent: Mar. 1, 2011

(54) SOLID-STATE IMAGING DEVICE AND METHOD OF DRIVING THE SAME

(75) Inventor: Minoru Kashiwagi, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 466 days.

(21) Appl. No.: 12/030,487

(22) Filed: Feb. 13, 2008

(65) Prior Publication Data

US 2008/0198252 A1    Aug. 21, 2008

(30) Foreign Application Priority Data

Feb. 15, 2007    (JP) .............................. 2007-035173

(51) Int. Cl.
H04N 3/14       (2006.01)
H04N 5/335      (2006.01)

(52) U.S. Cl. ..................... 348/303; 348/315; 348/311

(58) Field of Classification Search ................ 348/303, 348/315, 311
See application file for complete search history.

(56) References Cited

U.S. PATENT DOCUMENTS

| | | | | |
|---|---|---|---|---|
| 5,317,408 A | * | 5/1994 | Hirota | .................... 348/315 |
| 5,796,432 A | * | 8/1998 | Iesaka et al. | ................. 348/311 |
| 6,356,305 B1 | * | 3/2002 | Akagawa | ..................... 348/311 |
| 2005/0069293 A1 | | 3/2005 | Monoi | |
| 2007/0115380 A1 | * | 5/2007 | Shibata et al. | ............... 348/311 |

FOREIGN PATENT DOCUMENTS

| | | |
|---|---|---|
| JP | 5-110759 | 4/1993 |
| JP | 2001-352490 | 12/2001 |
| JP | 2005-50951 | 2/2005 |

* cited by examiner

*Primary Examiner*—James M Hannett
(74) *Attorney, Agent, or Firm*—Oblon, Spivak, McClelland, Maier & Neustadt, L.L.P.

(57) ABSTRACT

A shift gate is arranged to be adjacent to a pixel column including a plurality of photosensitive pixels. The shift gate controls a storage time of a signal charge generated in the photosensitive pixels based on a shift pulse signal. The signal charge generated in the photosensitive pixels is transferred to an analog shift register via the shift gate. The analog shift register has a plurality of transfer stages independently driven using a plurality of drive signals. The signal charge generated in the photosensitive pixels is successively transferred by the transfer stages, and detected by an output unit provided at an end portion of the analog shift register so that an output signal is converted. The analog shift register makes an addition of the signal charges in accordance with drive signals when the transfer stages transfer the signal charges.

12 Claims, 29 Drawing Sheets

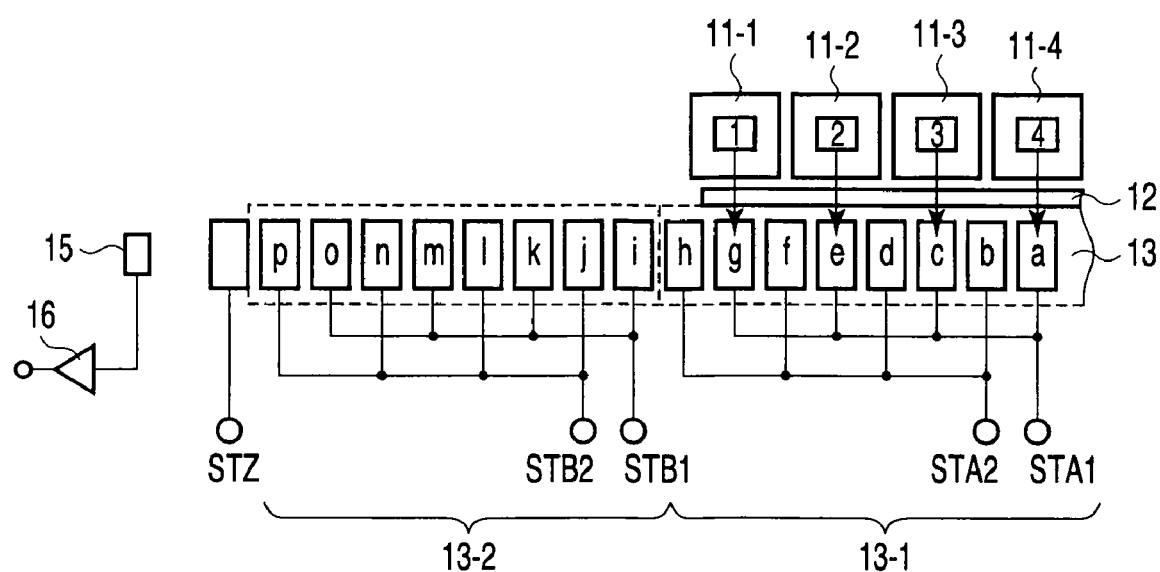
F I G. 7

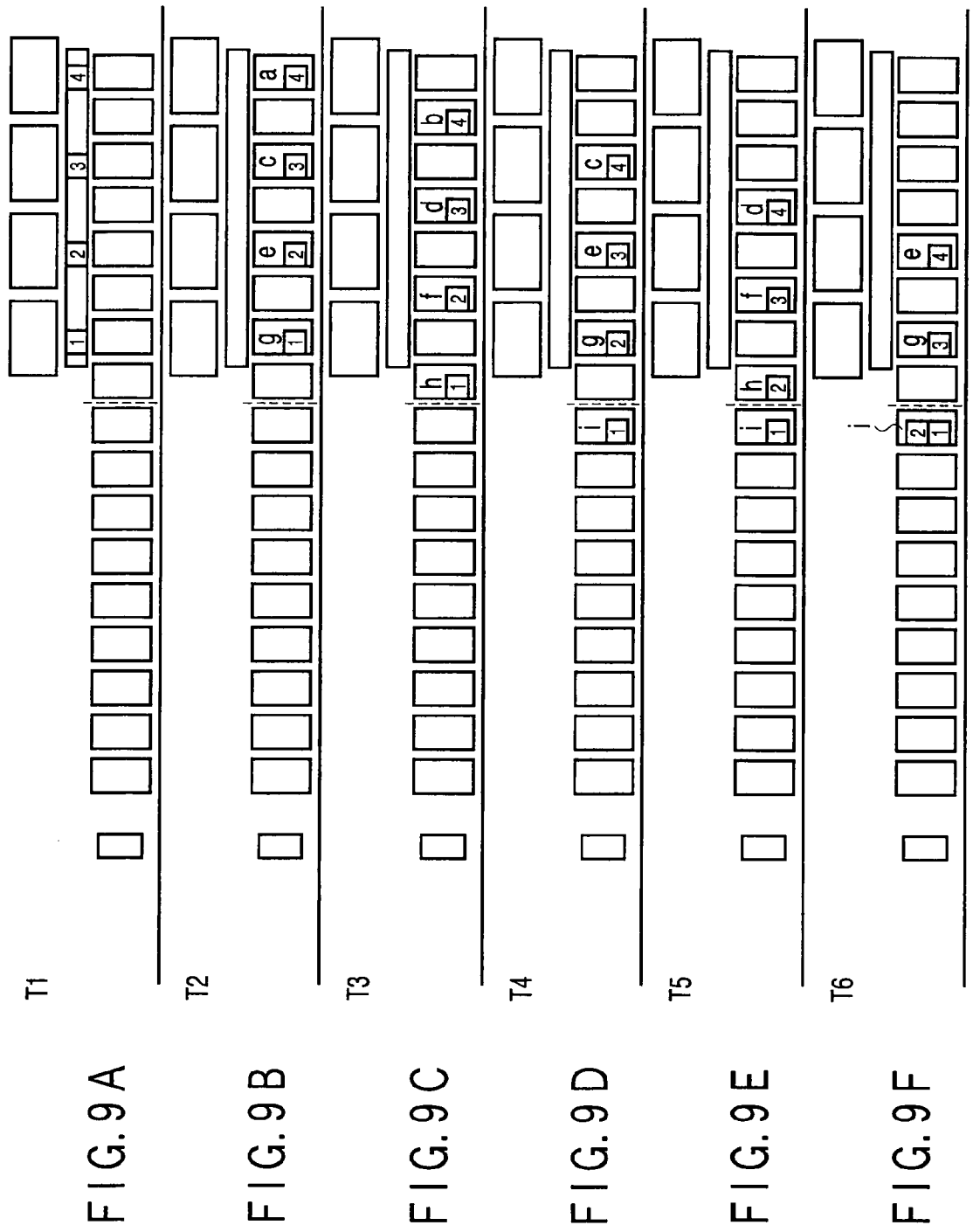

FIG. 9G T7
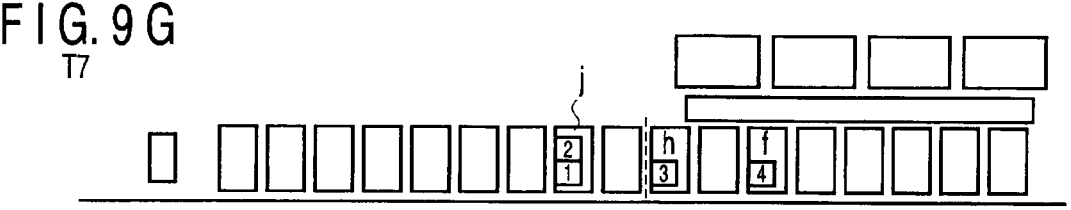
FIG. 9H T8
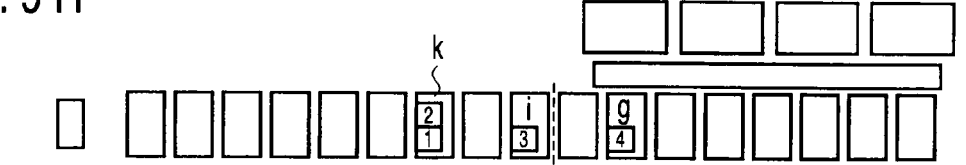
FIG. 9I T9
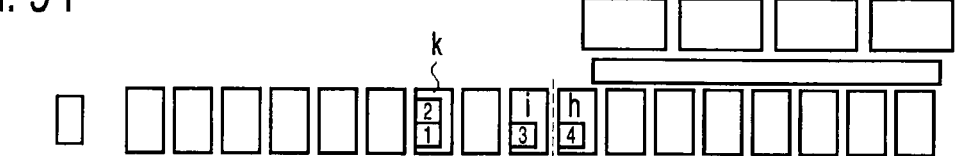
FIG. 9J T10
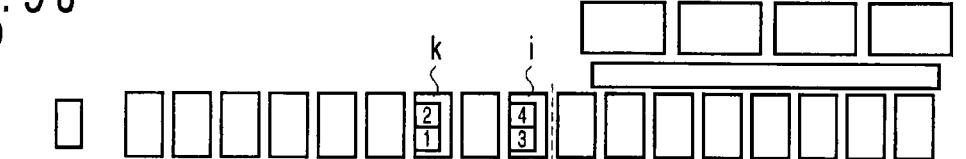
FIG. 9K T11
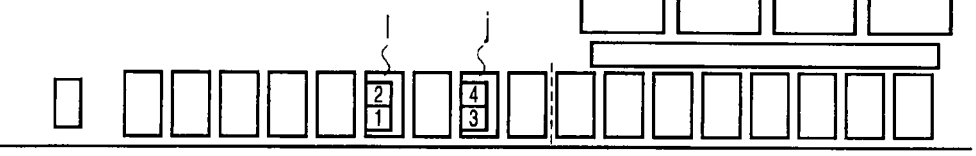
FIG. 9L T12
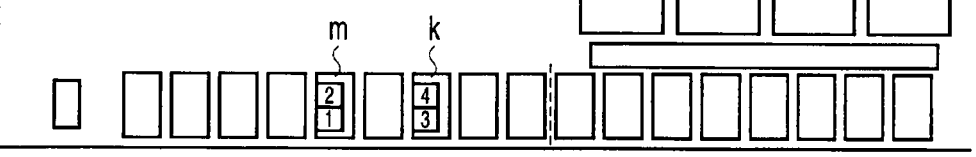
FIG. 9M T13
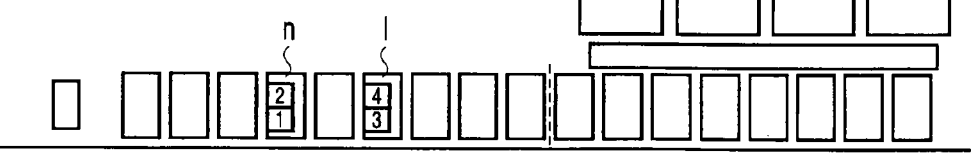
FIG. 9N T14
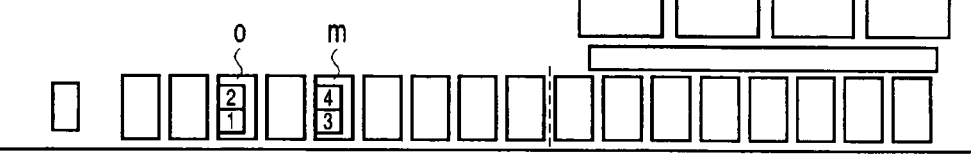

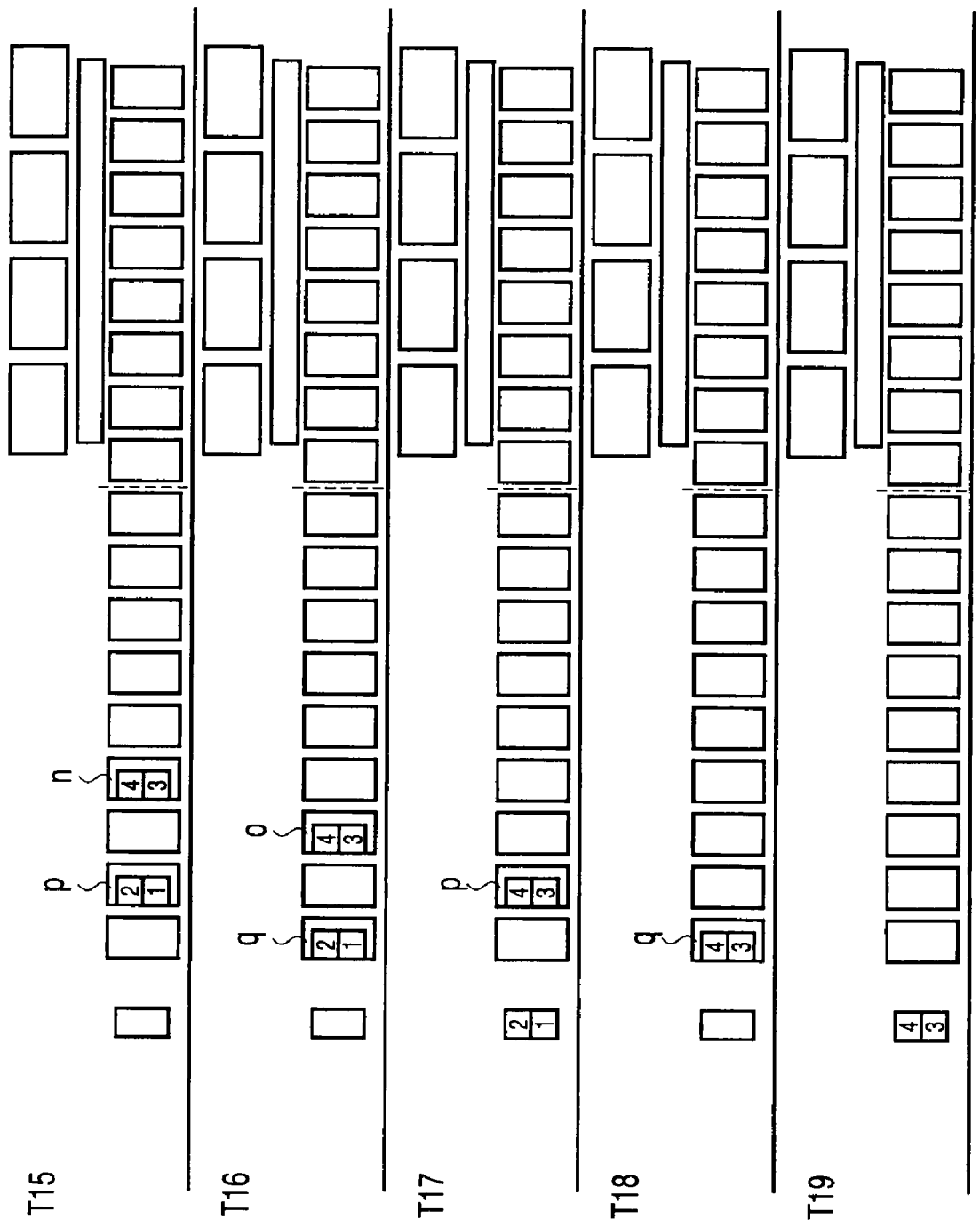

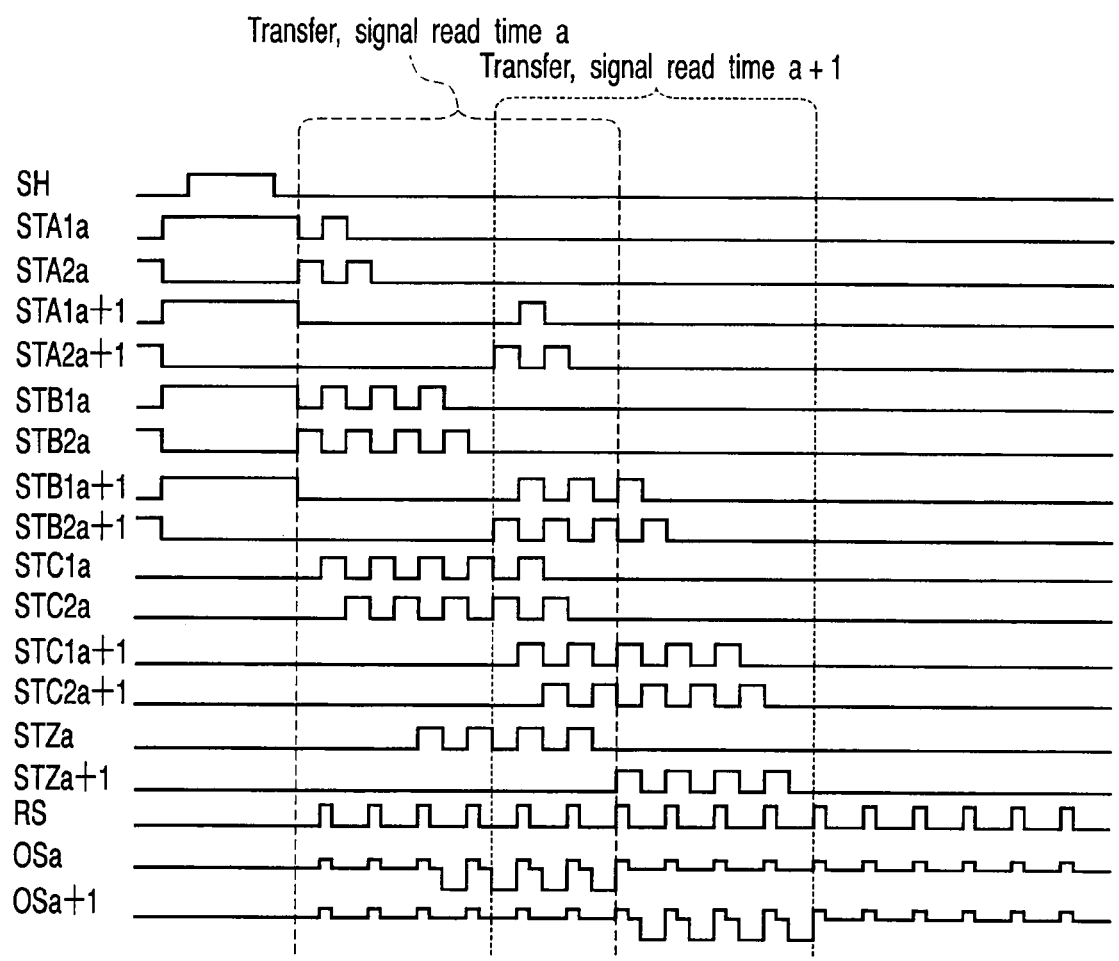
F I G. 3 4

SOLID-STATE IMAGING DEVICE AND METHOD OF DRIVING THE SAME

CROSS-REFERENCE TO RELATED APPLICATIONS

This application is based upon and claims the benefit of priority from prior Japanese Patent Application No. 2007-035173, filed Feb. 15, 2007, the entire contents of which are incorporated herein by reference.

BACKGROUND OF THE INVENTION

1. Field of the Invention

The present invention relates to a solid-state imaging device, which can change resolution, and to a method of driving the solid-state imaging device.

2. Description of the Related Art

A solid-state imaging device is used for the following image sensors. One is a one-dimensional image sensor used for reading an image in a scanner. Another is a two-dimensional image sensor used for reading a two-dimensional image such as a digital camera and a mobile phone with a camera. For example, the following solid-state imaging device has been disclosed in U.S. Pat. Appln. Publication No. US 2005/0069293 A1. The solid-state imaging device reads an image after adding a signal charge generated in a photosensitive pixel to change resolution. The solid-state imaging device disclosed in the foregoing Publication is provided with a plurality of charge transfers between photosensitive pixels and charge detectors. The charge transfer temporarily stores a signal charge generated in each photosensitive pixel, and transfers the stored signal charge to the charge detector when a pulse signal is applied. The charge detectors detect the signal charge, and then, convert it to an electric signal. A plurality of transistors is interposed between the charge transfers and output buffer.

The foregoing transistors are selectively turned on in accordance with the resolution of a read signal to be output. For example, in high resolution, the transistors are successively selected and turn on, and then, electric signals converted by the charge detectors are sent to the output buffer. In intermediate resolution, some of the transistors are simultaneously selected and turn on, and then, electric signals converted by some of the charge detectors are added, and thereafter, sent to the output buffer. In low resolution, all of the transistors are simultaneously selected and turn on, and then, all electric signals converted by the charge detectors are added, and thereafter, sent to the output buffer. As described above, according to the solid-state imaging device disclosed in the foregoing U.S. Publication, the transistors are selectively turned on. In this way, the resolution is readily changed.

However, the signal charge is transferred in a vertical direction with respect to the array direction of photosensitive pixels. For this reason, an array pitch of the photosensitive pixel becomes narrow, and thereby, the width of each transfer electrode of the charge transfer is narrowed. This is a factor of reducing a charge storable in each transfer electrode. The storage charge of each transfer electrode is reduced, and thereby, this is a factor of reducing the sensitivity. In order to solve the foregoing disadvantage, the electrode length of each transfer electrode is set longer to secure sufficient storage charge. By doing so, time is taken to transfer a charge, and this is a factor of transfer failure of the charge.

BRIEF SUMMARY OF THE INVENTION

According to a first aspect of the present invention, there is provided a solid-state imaging device comprising:

a pixel column having a plurality of photosensitive pixels photo-electrically converting incident light;

a shift gate configured to arrange adjacent to the pixel column, and control a storage time of a signal charge generated in the photosensitive pixels based on a shift pulse signal;

an analog shift register having a plurality of transfer stages each driven according to mutually independent drive signals, and transferring a signal charge of the photosensitive pixels transferred via the shift gate to one direction;

an output unit configured to arrange adjacent to an end portion of the analog shift register, and detecting a signal charge transferred from the analog shift register to convert it into an output signal; and a control signal generation circuit generating the shift pulse signal and drive signals to control each operation of the shift gate and the analog shift register.

According to a second aspect of the present invention, there is provided a solid-state imaging device comprising:

a plurality of pixel columns each having a plurality of photosensitive pixels photo-electrically converting incident light;

a plurality of shift gates configured to arrange adjacent to the plurality of pixel columns, and control a storage time of a signal charge generated in the pixels of the plurality of pixel columns based on shift pulse signals;

a plurality of analog shift registers each having a plurality of transfer stages each driven according to mutually independent drive signals, and transferring signal charges of the plurality of photosensitive pixels of the plurality of pixel columns transferred via the plurality of shift gates to one direction;

a plurality of output units each configured to arrange adjacent to each one end portion of the plurality of analog shift registers, and each detecting a signal charge transferred from each of the plurality of analog shift registers to convert it into an output signal; and a control signal generation circuit generating the shift pulse signals and the drive signals to control each operation of the plurality of shift gates and the plurality of analog shift registers.

According to a third aspect of the present invention, there is provided a method of driving a solid-state imaging device having a plurality of pixel columns each including photosensitive pixels photo-electrically converting incident light, a plurality of shift gates, a plurality of analog shift registers each including a plurality of transfer stages, and an output unit detecting a signal charge transferred from each of the analog shift registers, comprising:

transferring signal charges generated in the plurality of pixel columns to a first transfer stage of each of the plurality of analog shift registers;

simultaneously driving the first transfer stage and successively transferring the signal charges in the first transfer stage;

in a first read mode, driving a transfer stage after the first transfer stage of one of the analog shift registers, successively transferring the signal charges to a transfer electrode of the final transfer stage of the corresponding one analog shift register, successively detecting the signal charges by the corresponding output unit of the output units, and outputting an output signal, and further, successively driving a transfer stage after the first transfer stage of the remainder of the analog shift registers, successively transferring the signal charges successively to a transfer electrode of the final transfer stage of the corresponding analog shift register, and successively detecting the signal charges by the corresponding output unit, and outputting an output signal; and in a second read mode, driving a transfer stage after the first transfer stage of the analog shift registers using a drive signal having a cycle of 1/L (L is a natural number more than 2) with respect to a drive signal for driving each first transfer stage to add the signal charges while transferring them, and thereafter, transferring the added signal charges to a transfer electrode of the final transfer stage of the corresponding each analog shift register, and thereafter, successively detecting the added signal charges by the corresponding output unit of the output units, and outputting an output signal.

BRIEF DESCRIPTION OF THE SEVERAL VIEWS OF THE DRAWING

FIG. 7 is a top plan view showing a pattern layout of the solid-state imaging device shown in FIG. 1;

FIGS. 9A to 9S are schematic view showing the flow of a signal charge in the intermediate resolution read operation shown in FIG. 8;

FIG. 34 is another high resolution read operation timing chart in the solid-state imaging device shown in FIG. 24;

DETAILED DESCRIPTION OF THE INVENTION

Figure 1:
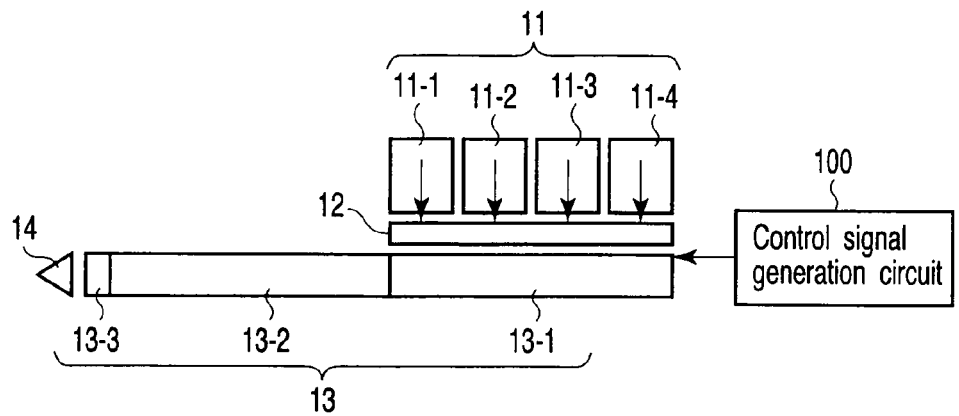
FIG. 1 is a block diagram schematically showing the configuration of a solid-state imaging device according to a first embodiment.

Various embodiments of the present invention will be hereinafter described with reference to the accompanying drawings. In the following description, the same reference numbers are used to designate the corresponding portions in the drawings, and the overlapping explanation is omitted.

First Embodiment

FIG. 1 is a block diagram schematically showing the configuration of a solid-state imaging device according to a first embodiment. FIG. 1 shows the configuration of a unit circuit applied to the case where the maximum number of pixels adding a signal charge is four of photosensitive pixels. In FIG. 1, the maximum number of pixels adding the signal charge is set to four pixels. In this case, the added maximum number is properly selectable from natural numbers more than 2.

A pixel column 11 is composed of four photosensitive pixels (hereinafter, referred to as cell) 11-1 to 11-4 photoelectrically converting incident light. These four cells are lineally arrayed. A shift gate 12 is arranged adjacent to the pixel column 11. The shift gate 12 controls storage time of a signal charge generated in cells 11-1 to 11-4. When the shift gate 12 is opened, the signal charge stored in cells 11-1 to 11-4 is transferred to an analog shift register 13.

The analog shift register 13 transfers the signal charge of cells 11-1 to 11-4 transferred via the shift gate 12 to one direction. The analog shift register 13 is divided into two transfer stages, that is, first transfer stage 13-1 and second transfer stage 13-2. However, the analog shift register 13 may be divided into three transfer stages or more.

The end portion of the analog shift register 13 is provided with an output unit 14. The output unit 14 detects the signal charge transferred by the analog shift register 13, and then, converts it into an output signal. In the analog shift register 13, a final transfer 13-3 is interposed between the second transfer stage 13-2 adjacent to the output unit 14 and the output unit 14. The final transfer 13-3 is configured in such a manner that a final transfer electrode of the second transfer stage is separated.

Figure 2:
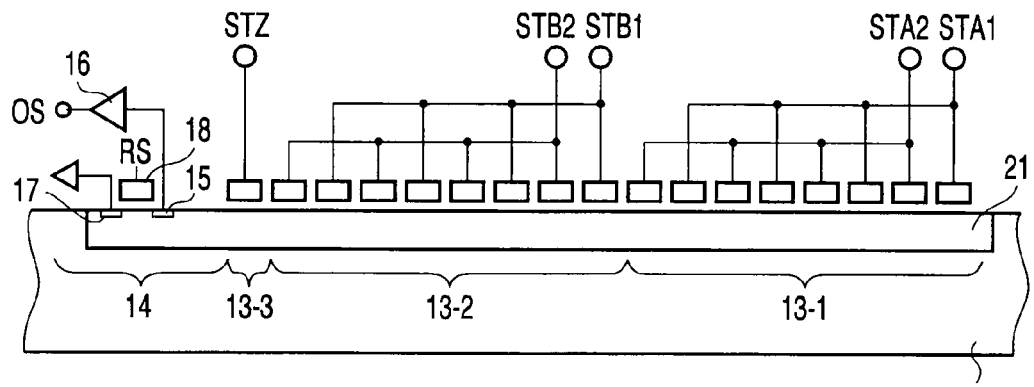
FIG. 2 is a cross-sectional view schematically showing the device structure of an analog shift register and an output unit shown in FIG. 1.

FIG. 2 is a cross-sectional view schematically showing the device structure of the analog shift register 13 and the output unit 14 shown in FIG. 1. As shown in FIG. 2, the first and second transfer stages 3-1 and 3-2 of the analog shift register 13 are arranged on the same channel formed on the surface of a semiconductor substrate 20. The first transfer stage 31-1 is provided with four pairs of transfer electrodes. Of four pairs of transfer electrodes, four transfer electrodes are each formed on the channel 21 via an insulating film, and supplied with a first drive pulse signal STA1. Another four transfer electrodes are each formed on the channel 21 via an insulating film, and arranged adjacent to the foregoing each transfer electrodes, and further, supplied with a second drive pulse signal STA2.

Likewise, the second transfer stage 31-2 is provided with four pairs of transfer electrodes. Of four pairs of transfer electrodes, four transfer electrodes are each formed on the channel 21 via an insulating film, and supplied with a third drive pulse signal STB1. Another four transfer electrodes are each formed on the channel 21 via an insulating film, and arranged adjacent to the foregoing each transfer electrodes, and further, supplied with a fourth drive pulse signal STB2.

In the first and second transfer stages 13-1 and 13-2, a pair of adjacent transfer electrodes supplied with mutually different drive pulse signal forms a one-step transfer. In the analog shift register 13 shown in FIG. 2, a signal charge is added when resolution is changed. In the second transfer stage 13-2, the number of transfer electrodes is set to four or more (eight in this embodiment) to secure the number of charges for obtaining the highest resolution. Hereinafter, the number of charges generated from one pixel is set as 1. Moreover, the number of charges is set as 1 when charges equivalent to two pixels are added.

The final transfer 13-3 is provided with one transfer electrode, which is formed on the channel 21 via an insulating film, and supplied with a fifth drive pulse signal STZ.

The output unit 14 is composed of a floating diffusion region 15 and an output buffer 16. The floating diffusion region 15 is formed in the channel 21 to be adjacent to the final transfer 13-3. The output buffer 16 is connected to the floating diffusion region 15. The output unit 14 is further provided with a drain diffusion region 17 in the channel 21. The drain diffusion region 17 discharges a signal charge after read in a state of separating from the floating diffusion region 15. The output unit 14 is further provided with a reset gate electrode 18 on the channel 21 between the floating diffusion region 15 and the drain diffusion region 17 via an insulating film. The reset gate electrode 18 controls the discharge of the signal charge. A control signal generation circuit 100 shown in FIG. 1 generates the following signals. One is first to fifth drive pulse signals for controlling an operation of the analog shift register 13. Another is a reset pulse signal RS supplied with the reset gate electrode 18. Another is a shift pulse signal SH for controlling the shift gate 12. In the following embodiments and modification examples, the control signal generation circuit 100 is provided. However, illustration of the circuit 100 is omitted therein.

Figure 3:
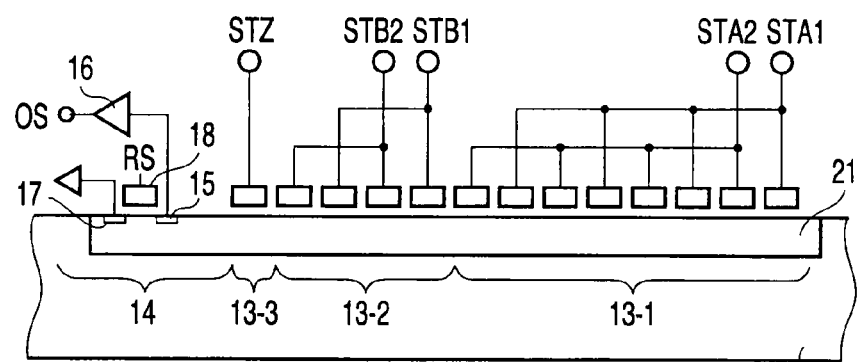
FIG. 3 is a cross-sectional view schematically showing another device structure of an analog shift register and an output unit shown in FIG. 1.

FIG. 3 is a cross-sectional view schematically showing another device structure of the analog shift register 13 and the output unit 14 shown in FIG. 1. FIG. 3 differs from FIG. 2 in the following point. Specifically, the second transfer stage 13-2 is provided with two pairs of transfer electrodes, which are each supplied with a third drive pulse signal STB1 and a fourth drive pulse signal STB2. In other words, the second transfer stage 13-2 of the analog shift register 13 is provided with two pairs of transfers (i.e., four transfer electrodes).

Figure 4:
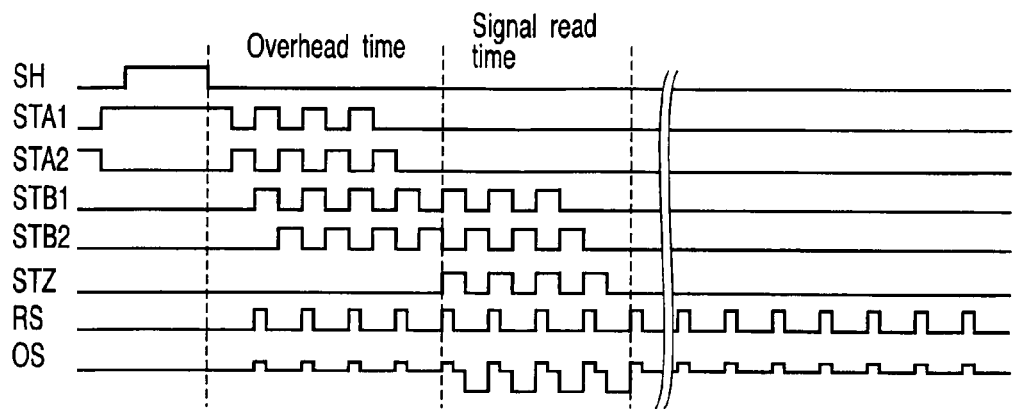
FIG. 4 is a read operation timing chart of high resolution in the solid-state imaging device shown in FIG. 1.
Figure 5:
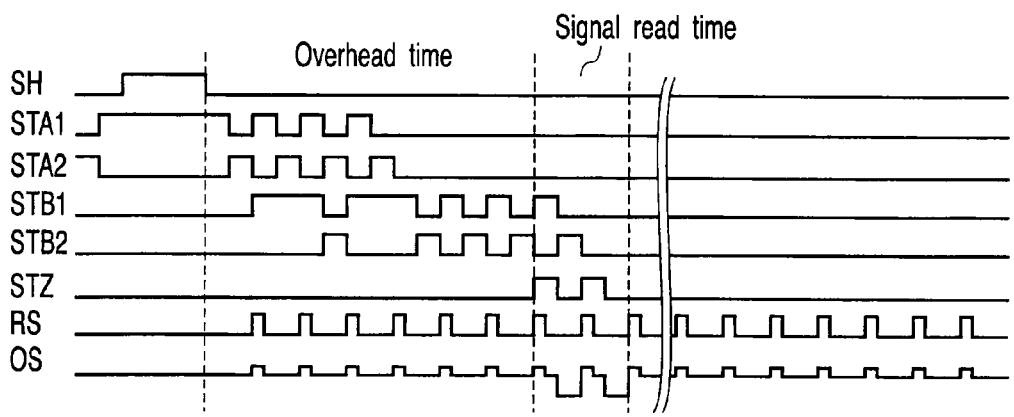
FIG. 5 is a read operation timing chart of intermediate resolution in the solid-state imaging device shown in FIG. 1.
Figure 6:
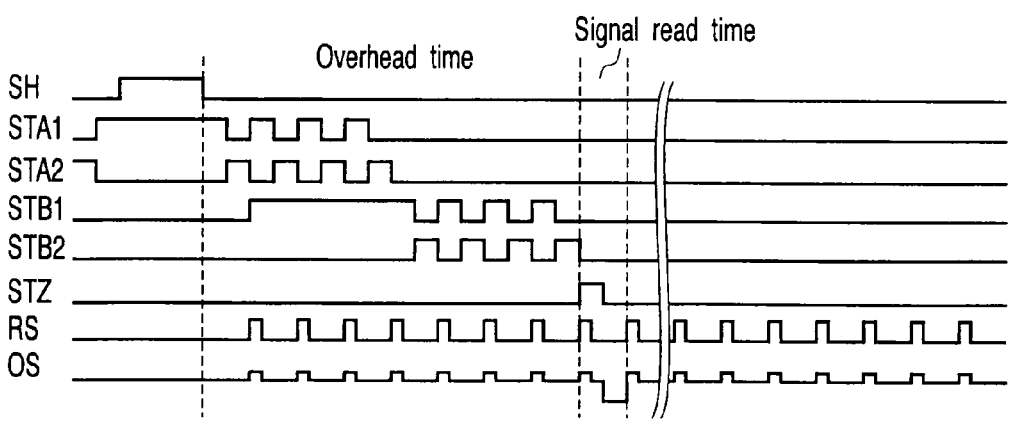
FIG. 6 is a read operation timing chart of low resolution in the solid-state imaging device shown in FIG. 1.

FIGS. 4 to 6 are read operation timing charts in the solid-state imaging device shown in FIG. 1. The solid-state imaging device shown in FIG. 1 has first and second read modes. According to the first read mode, high resolution read carrying out read using no addition is given. According to the second mode, intermediate or low resolution read carrying read using addition for a plurality of pixels is given. FIG. 4 shows the case of the high resolution read carrying out read using no addition. FIG. 5 shows the case of the intermediate resolution read carrying read using addition for two pixels. FIG. 6 shows the case of the low resolution read carrying read using addition for four pixels. In FIG. 4 to FIG. 6, SH denotes a shift pulse signal for controlling the shift gate 12, RS denotes a reset pulse signal for controlling the reset gate electrode 18, and OS denotes an output signal of the output buffer 16.

The high resolution operation shown in FIG. 4 will be hereinafter described. When the shift pulse signal SH is set to high level, the shift gate is opened. Then, the storage time of signal charge of four cells 11-1 to 11-4 of the pixel column 11 ends while the signal charge stored in the cells 11-1 to 11-4 moves to the shift gate 12. The first drive pulse signal STA1 is set to high level from timing slightly before the signal SH is set to high level. Thereafter, the shift pulse signal SH changes from high level to low level, and thereby, the signal charge of cells 11-1 to 11-4 moved to the shift gate 12 is transferred to the first transfer stage 13-1 of the analog shift register 13. In the overhead time, the first and second drive pulse signals STA1 and STA2 supplied to the first transfer stage 13-1 repeat turn on/off at a predetermined cycle. The third and fourth drive pulse signals STB1 and STB2 supplied to the second transfer stage 13-2 repeat turn on/off at a predetermined cycle from one-pulse delayed timing. In this way, the signal charge of four cells 11-1 to 11-4 transferred to the first transfer stage 13-1 is successively transferred to the final transfer of the first transfer stage 13-1, and further, transferred to the final transfer of the second transfer stage 13-2.

When the first signal charge of cells reaches the final transfer of the second transfer stage 13-2, the next signal read time is started. In the signal read time, the transfer electrode of the final transfer 13-3 is supplied with the fifth drive pulse signal STZ repeating turn on/off at a predetermined cycle. In this way, the signal charge of four cells 11-1 to 11-4 is successively sent to the output unit 14, and then, the output buffer 16 outputs an output signal OS corresponding to four cells.

The intermediate resolution read shown in FIG. 5 differs from the high resolution read shown in FIG. 4 in the following point. At the initial stage in the overhead time, each cycle of the third and fourth drive pulse signals STB1 and STB2 supplied to the second transfer stage 13-2 is set to 1/L (L=2) as compared with each cycle of the first and second drive pulse signals STA1 and STA2 supplied to the first transfer stage 13-1.

Namely, in the overhead time, the signal charge of each cell is transferred from the first transfer stage 13-1 of the analog shift register 13 to the second transfer stage 13-2. In this case, each cycle of the third and fourth drive pulse signals STB1 and STB2 is set to ½ of the first and second drive pulse signals STA1 and STA2. By doing so, charges equivalent to two pixels are added by the transfer of the second transfer 13-2 adjacent to the first transfer stage 13-1. Thereafter, the charges are transferred to the final transfer of the second transfer stage 13-2 of the analog shift register 13.

Then, when the signal charges equivalent to the initially added two cells reach the final transfer of the second transfer stage 13-2, the next signal read time is started. In the signal read time, the transfer electrode of the final transfer 13-3 is supplied with the fifth drive pulse signal STZ repeating turn on/off at a predetermined cycle. In this way, two signal charges of added two cells are successively sent to the output unit 14, and thus, the output buffer 16 outputs the output signal OS.

The low resolution read shown in FIG. 6 differs from the high resolution read shown in FIG. 4 in the following point. At the initial stage in the overhead time, each cycle of the third and fourth drive pulse signals STB1 and STB2 supplied to the second transfer stage 13-2 is set to 1/L (L=4) as compared with each cycle of the first and second drive pulse signals STA1 and STA2 supplied to the first transfer stage 13-1.

Namely, in the overhead time, the signal charge of each cell is transferred from the first transfer stage 13-1 to the second transfer stage 13-2. In this case, each cycle of the third and fourth drive pulse signals STB1 and STB2 is set to ¼ of the first and second drive pulse signals STA1 and STA2. By doing so, charges equivalent to four pixels are added by the transfer of the second transfer stage 13-2 adjacent to the first transfer stage 13-1. Thereafter, the charges are transferred to the final transfer of the second transfer stage 13-2.

Then, when the signal charges equivalent to the added four cells reach the final transfer of the second transfer stage 13-2, the next signal read time is started. In the signal read time, the transfer electrode of the final transfer 13-3 is supplied with the fifth drive pulse signal STZ. In this way, four signal charges of added four cells are successively sent to the output unit 14, and thus, the output buffer 16 outputs the output signal OS.

Figure 8:
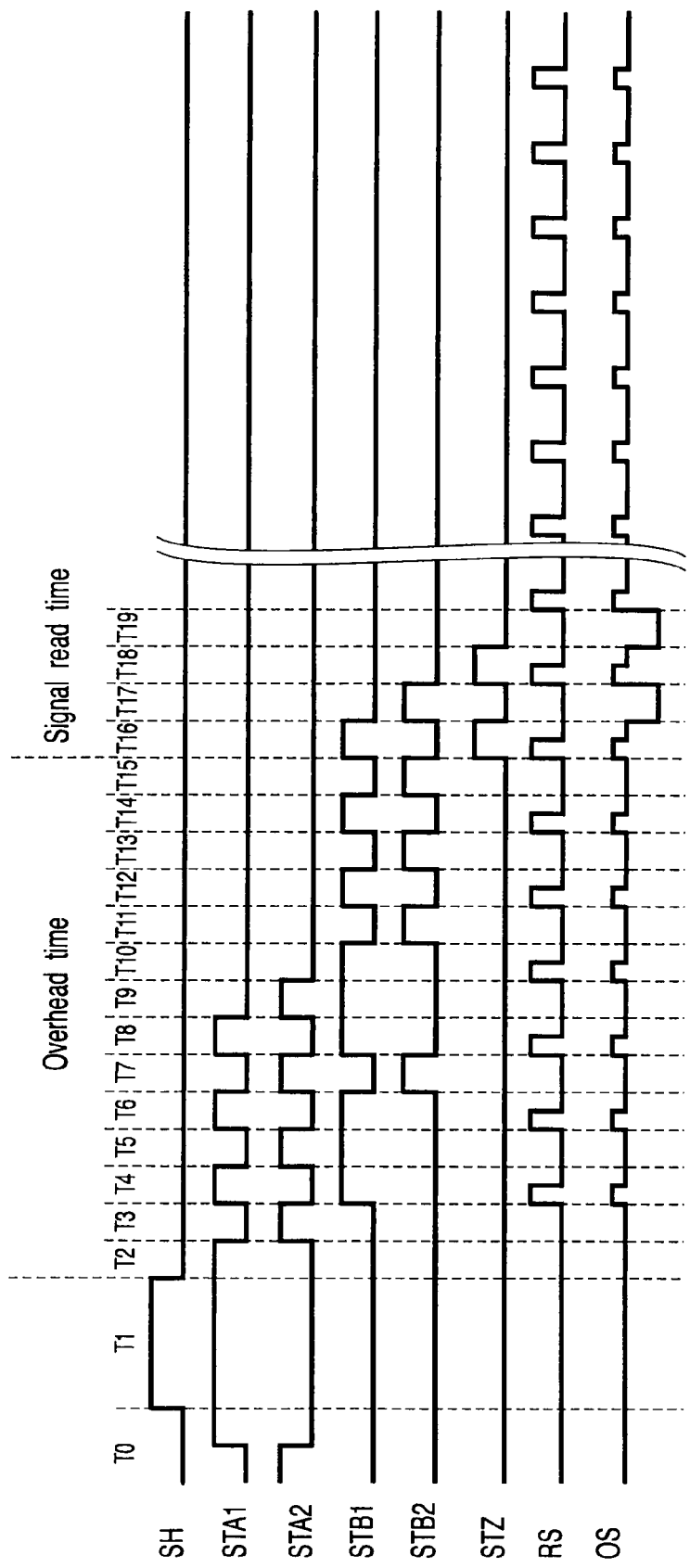
FIG. 8 is a read operation timing chart of intermediate resolution in the solid-state imaging device shown in FIG. 1.

FIG. 7 is a top plan view showing a pattern layout of the solid-state imaging device shown in FIG. 1. FIG. 8 is a read operation timing chart of intermediate resolution in the solid-state imaging device shown in FIG. 1 (equivalent to the timing chart of FIG. 5). In FIG. 7, alphabets "a" to "h" are given to eight transfer electrodes of the first transfer stage of the analog shift register 13. Further, alphabets "i" to "p" are given to eight transfer electrodes of the second transfer stage.

FIGS. 9A to 9S are views showing the intermediate resolution read operation shown in FIG. 8. Specifically, FIGS. 9A to 9S are views schematically showing the flow of a signal charge in a read operation when the number of added pixels is 2. In FIGS. 9A to 9S, numerals 1 to 4 surrounded by a square denote a cell signal charge, and times T1 to T19 correspond to those shown in FIG. 8. The flow of the signal charge and the added state of the signal charge are seen from FIGS. 9A to 9S; therefore, the explanation is omitted.

Figure 10:
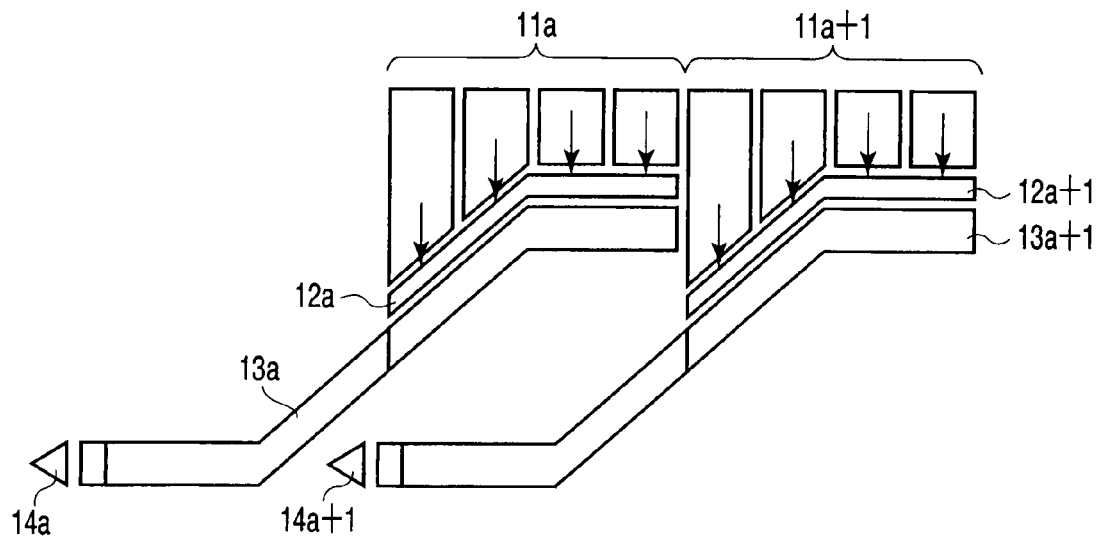
FIG. 10 is a block diagram showing the configuration of a solid-state imaging device in which a plurality of unit circuits shown in FIG. 1 is arrayed.

FIG. 10 shows a solid-state imaging device in which a plurality of unit circuits (two in this embodiment) shown in FIG. 1 is arrayed. In FIG. 10, reference numerals 11a and 11a+1 denote pixel columns, and 12a and 12a+1 denote shift gates. Further, 13a and 13a+1 denote analog shift registers, and 14a and 14a+1 denote output units.

One unit circuit is composed of the pixel column 11a, the shift gate 12a, the analog shift register 13a and the output unit 14a. The shift gate 12a is arranged to be adjacent to the pixel column 11a. A signal charge is transferred to the analog shift register 13a via the shift gate 12a. The output unit 14a converts the signal charge transferred from the analog shift register 13a. Likewise, another unit circuit is composed of the pixel column 11a+1, the shift gate 12a+1, the analog shift register 13a+1 and the output unit 14a+1. The shift gate 12a+1 is arranged to be adjacent to the pixel column 11a+1. A signal charge is transferred to the analog shift register 13a+1 via the shift gate 12a+1. The output unit 14+1 converts the signal charge transferred from the analog shift register 13a+1.

Figure 11:
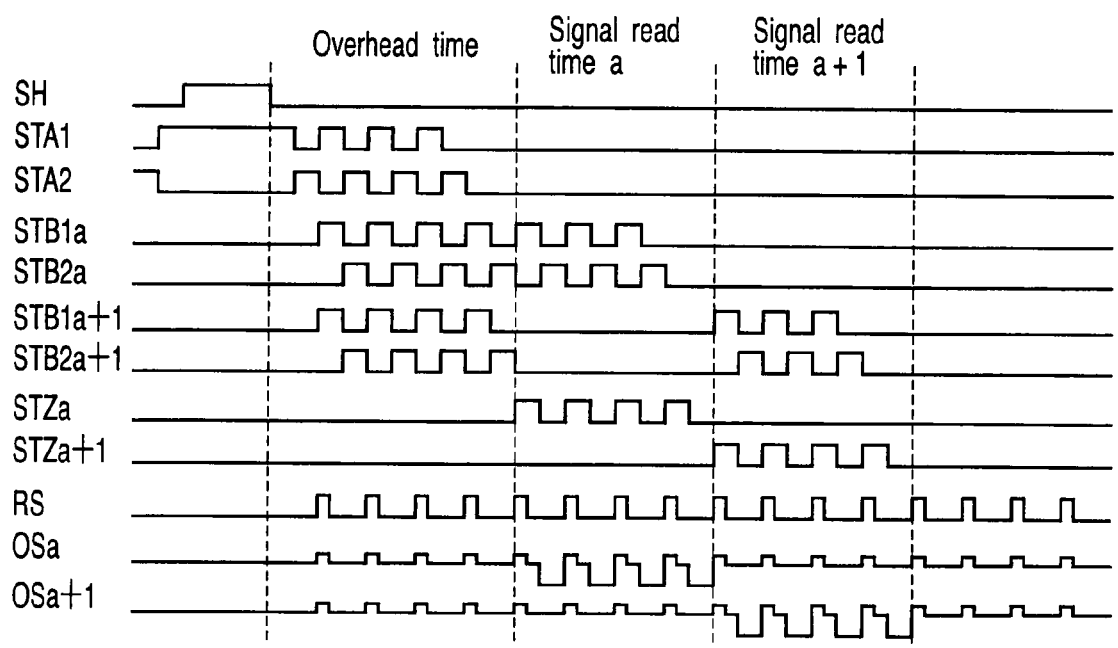
FIG. 11 is a read operation timing chart of high resolution in the solid-state imaging device shown in FIG. 10.
Figure 12:
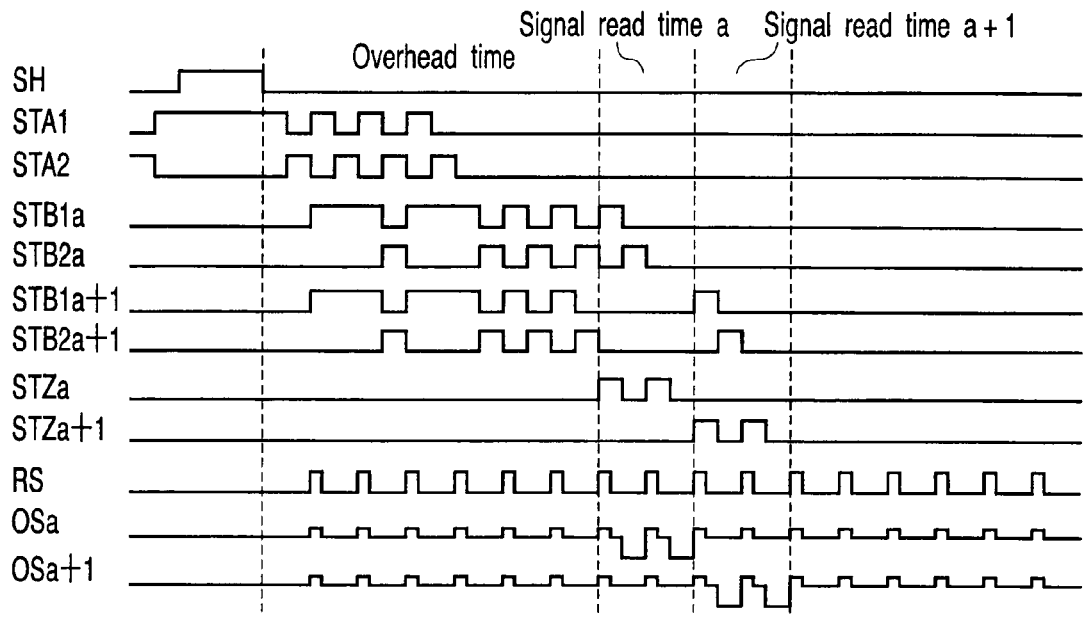
FIG. 12 is a read operation timing chart of intermediate resolution in the solid-state imaging device shown in FIG. 10.
Figure 13:
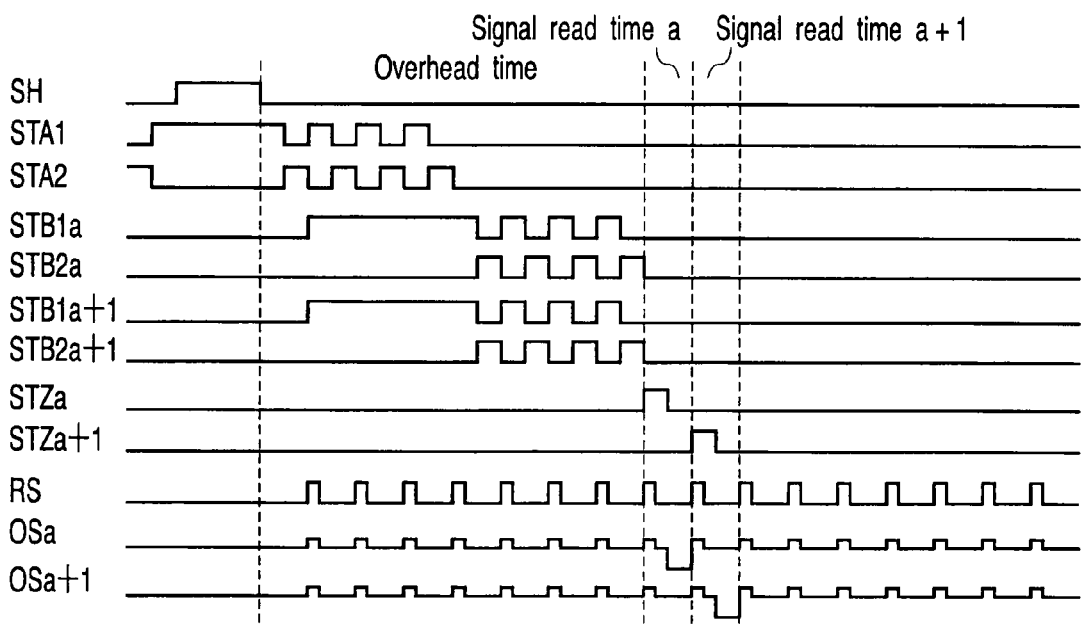
FIG. 13 is a read operation timing chart of low resolution in the solid-state imaging device shown in FIG. 10.

FIGS. 11 to 13 are read operation timing charts in the solid-state imaging device shown in FIG. 10. FIG. 11 shows the case of high resolution carrying out read using no addition. FIG. 12 shows the case of intermediate resolution carrying out read using addition for two pixels. FIG. 13 shows the case of low resolution carrying out read using addition for four pixels. First transfer stages 13-1 of analog shift registers 13a and 13a+1 are concurrently supplied with the first and second drive pulse signals STA1 and STA2. Second transfer stages 13-2 are supplied with different third and fourth drive pulse signals STB1 and STB2. In FIG. 11 to FIG. 13, the foregoing drive pulse signals are given as STB1a, STB2a, STB1a+1 and STB2a+1. In different unit circuits, final transfers 13-3 are supplied with different fifth drive pulse signals STZ. In FIG. 11 to FIG. 13, these drive pulse signals are given as STZa and STZa+1. Output signals from the output units 14a and 14a+1 are given as OSa and OSa+1.

In the solid-state imaging device of FIG. 10, the unit circuits make the same operation in the overhead time. Thereafter, in the signal read time, the method of supplying third and fourth drive pulse signals STB1a, STB2a and STB1a+1, STB2a+1 is only different from the cases of FIG. 4 to FIG. 6. Specifically, the read operation is made from the unit circuit required for most early reading the signal charge of the pixel columns 11a and 11a+1. Thus, the operational explanation is omitted.

Figure 14:
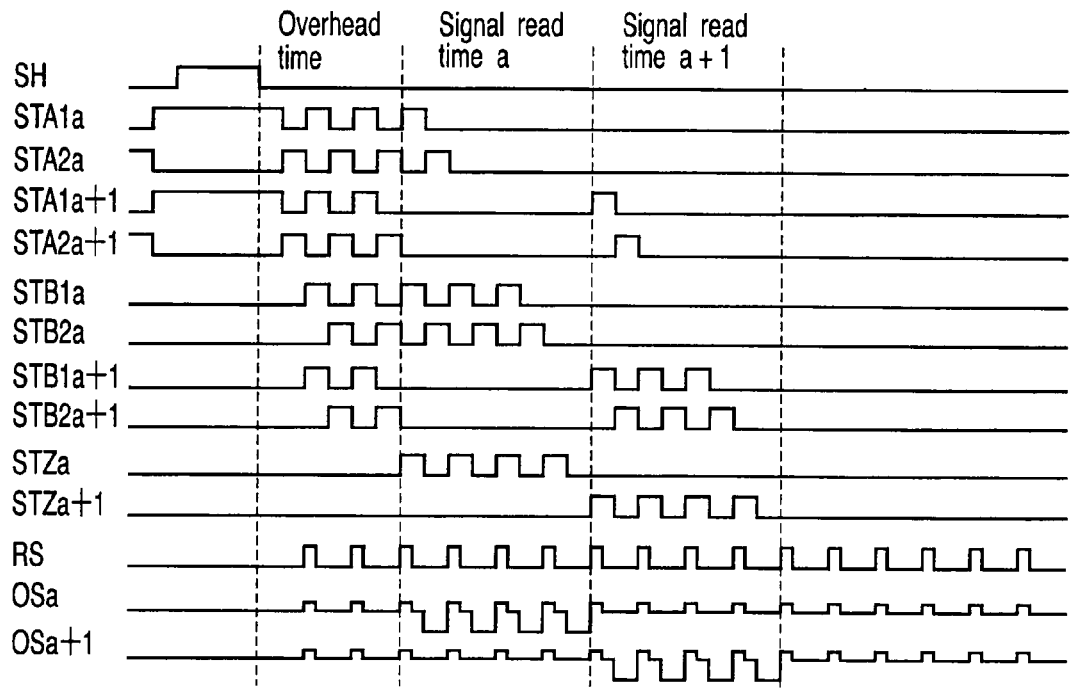
FIG. 14 is another high resolution read operation timing chart in the solid-state imaging device shown in FIG. 10.
Figure 15:
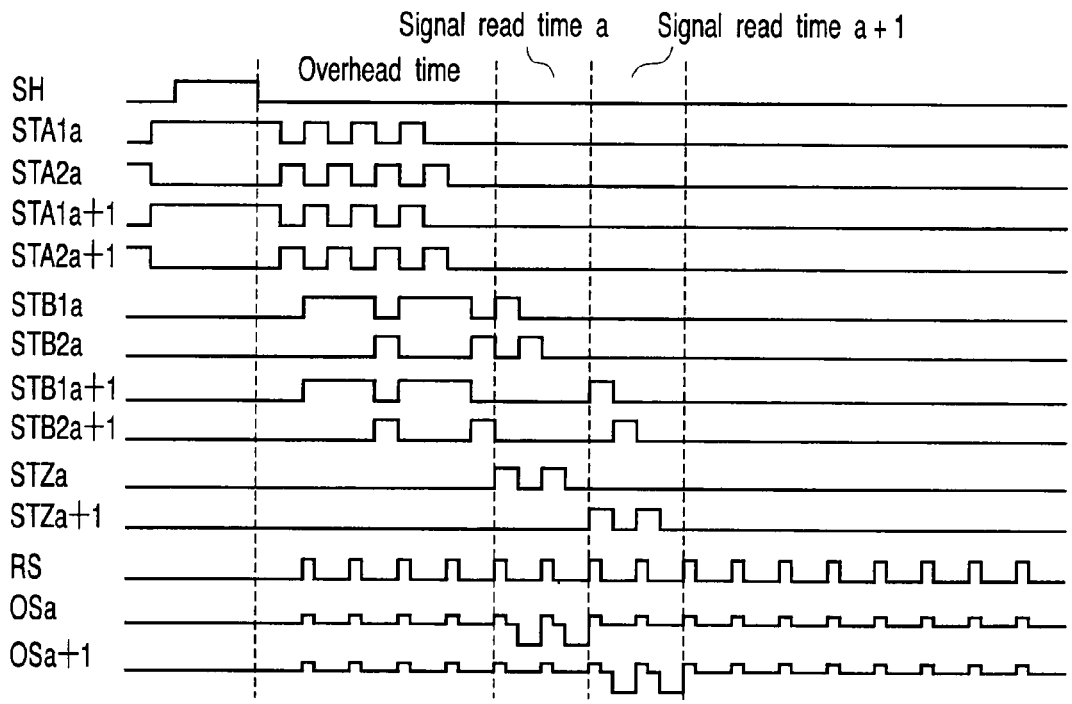
FIG. 15 is another intermediate resolution read operation timing chart in the solid-state imaging device shown in FIG. 10.
Figure 16:
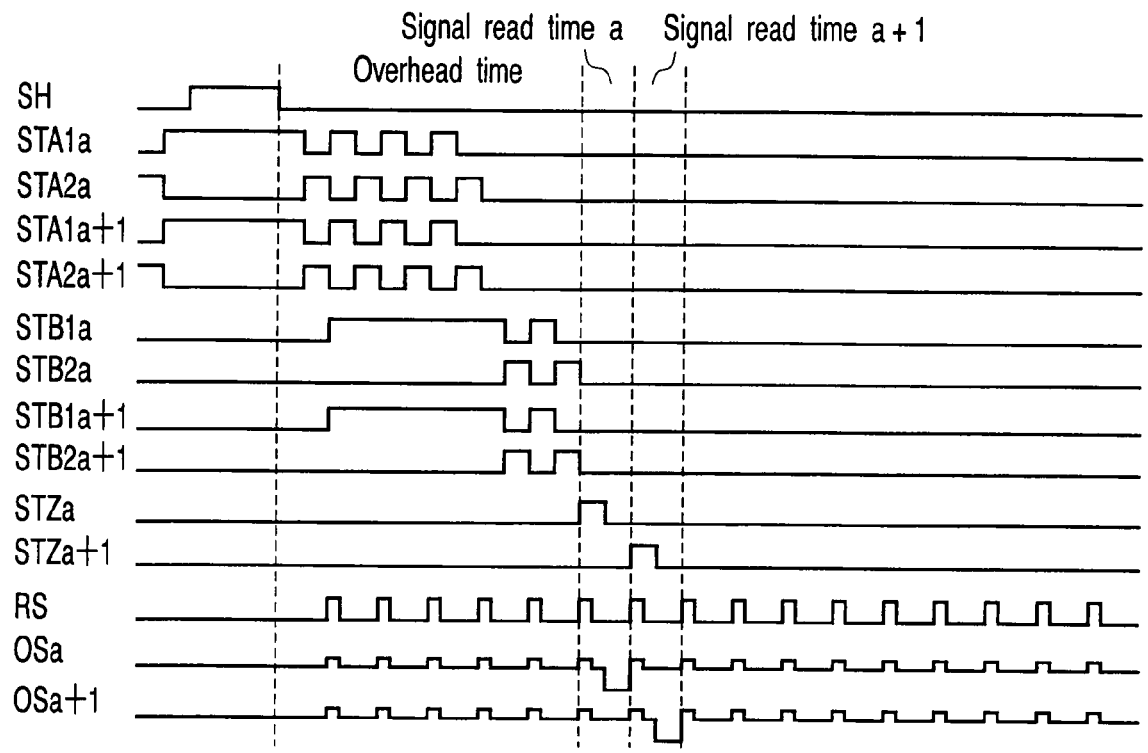
FIG. 16 is another low resolution read operation timing chart in the solid-state imaging device shown in FIG. 10.

FIGS. 14 to 16 are another read operation timing charts in the solid-state imaging device shown in FIG. 10. FIG. 14 shows the case of high resolution carrying out read using no addition. FIG. 15 shows the case of intermediate resolution carrying out read using addition for two pixels. FIG. 16 shows the case of low resolution carrying out read using addition for four pixels.

According to the foregoing operation shown in FIG. 11 to FIG. 13, each first transfer stage 13-1 of the analog shift registers 13a and 13a+1 is controlled in common. However, the number of transfers in each second transfer stage 13-2 of the analog shift registers 13a and 13a+1 increases, and further, the overhead time becomes long. According to the operation shown in FIG. 14 to FIG. 16, basic timing is the same as each of FIG. 11 to FIG. 13. But, the method of controlling the first transfer stage 13-1 must be changed every unit circuit. However, the number of transfers of the second transfer stage 13-2 can be reduced, and in addition, the overhead time is shortened.

Specifically, the solid-state imaging device shown in FIG. 10 has a plurality of pixel columns 11a, 11a+1, shift gates 12a, 12a+1, analog shift registers 13a, 13a+1 and output units 14a, 14a+1. The pixel columns 11a and 11a+1 are each composed of a plurality of lineally arrayed photosensitive pixels photo-electrically converting incident light. The analog shift registers 13a and 13a+1 each have a plurality of transfer stages. The output units 14a and 14a+1 each detect a signal charge transferred from each analog shift register to convert it into an output signal. As depicted in FIG. 11 or FIG. 14, according to the high resolution carrying out read using no addition, the signal charges generated in pixel columns 11a and 11a+1 are transferred to each first transfer stage 13-1 of each analog sift register via shift gates 12a and 12a+1. In this way, first transfer stages 13-1 of the analog shift registers are simultaneously driven to successively move the signal charges by each first transfer stage. The transfer stage (i.e., second transfer stage 13-2) after the first transfer stage of one analog shift register 13a of several analog shift registers is driven. In this way, the signal charges are successively moved to the final transfer electrode of the analog shift register 13a. Then, the corresponding output unit 14a of the output units 14a and 14a+1 successively detects the signal charges to output an output signal. The transfer stage (i.e., second transfer stage 13-2) after the first transfer stage of the remainder of the analog shift registers is successively driven. In this way, the signal charges are successively moved to the final transfer electrode (second transfer stage 13-2) of the corresponding each analog shift register. Then, the corresponding output unit 14a+1 successively detects the signal charges to sequentially output an output signal.

The solid-state imaging device shown in FIG. 10 has a plurality of pixel columns 11a, 11a+1, shift gates 12a, 12a+1, analog shift registers 13a, 13a+1 and output units 14a, 14a+1. The pixel columns 11a and 11a+1 are each composed of a plurality of lineally arrayed photosensitive pixels photo-electrically converting incident light. The analog shift registers 13a and 13a+1 each have a plurality of transfer stages. The output units 14a and 14a+1 each detect a signal charge transferred from each analog shift register to convert it into an output signal. As seen from FIG. 12 or FIG. 15 and FIG. 13 or FIG. 16, according to the intermediate or low resolution carrying out using addition for two or four pixels, the signal charges generated in the pixel columns 11a and 11a+1 are transferred to each first transfer stage 13-1 of the analog shift registers via the shift gates 12a and 12a+1. The first transfer stages of the analog shift registers are simultaneously driven so that the signal charges are successively moved to each first transfer stage. The transfer stage (i.e., second transfer stage 13-2) after the first transfer stage of each analog shift register is driven using the following drive signal to add the signal charges while transferring them. The drive signal has a 1/L (L is a natural number more than 2) cycle with respect to the drive signal when each first transfer stage is driven. Thereafter, the added signal charges are moved to the final transfer electrode of the corresponding each analog shift register. Then, of the output units 14a and 14a+1, the corresponding output unit successively detects the added signal charges to sequentially output an output signal.

The solid-state imaging device according to the first embodiment has the following advantage. The frequency (data rate) of the output signal OS in the signal read time is the same as the case of using no addition of signal charges (high resolution) without changing the drive frequency of the analog shift register 13 even if addition of signal charges is made (low/intermediate resolution).

The final transfer 13-3 of the analog shift register 13 is driven using a drive signal (i.e., fifth drive pulse signal STZ) different from the second transfer stage 13-2. By doing so, it is possible to prevent malfunction such as signal delay.

Moreover, the solid-state imaging device of FIG. 10 is provided with a plurality of unit circuits. In the solid-state imaging device of FIG. 10, the shift pulse signal SH supplied to each shift gate 12 is set to the same so that each shift gate 12 is controlled at the same timing. In this way, it is possible to keep the unity of charge storage time in all cells.

In the solid-state imaging device of the first embodiment, the analog shift register 13 is divided into some transfer stages (two in this embodiment). The cycle of the drive signal (third and fourth drive pulse signals STB1 and STB2) supplied to the second transfer stage 13-2 is changed. In this way, it is possible to readily change the resolution of the read signal.

In addition, when the analog shift register 13 transfers the signal charge, the signal charge is transferred to a horizontal direction to the arrangement direction of pixel column. Thus, the electrode length (i.e., right and left direction length of transfer electrode shown in FIG. 2 and FIG. 3) of each transfer electrode of the analog shift register 13 is shortened. Therefore, charges are readily transferred, and thus, this serves to prevent transfer failure. Incidentally, the electrode length of each transfer electrode is shortened, and thereby, the transfer storage charge capacity is reduced. However, it is possible to prevent the foregoing reduction by widening the electrode width of each transfer electrode (i.e., depth direction length of transfer electrode of FIG. 2 and FIG. 3).

Second Embodiment

Figure 17:
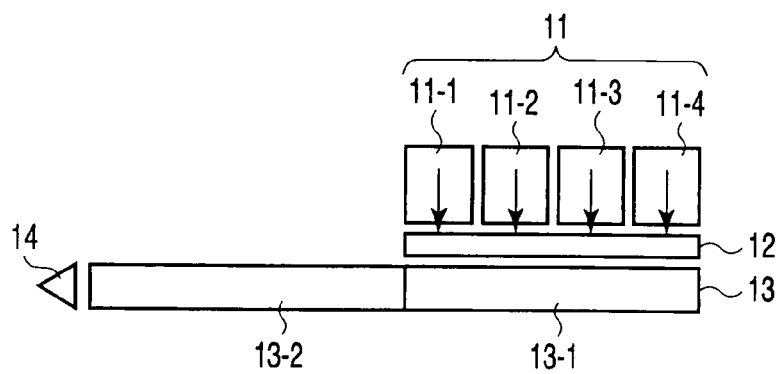
FIG. 17 is a block diagram schematically showing the configuration of a solid-state imaging device according to a second embodiment.

FIG. 17 is a block diagram schematically showing the configuration of a solid-state imaging device according to a second embodiment. FIG. 17 shows the configuration of a unit circuit of the solid-state imaging device applied to the case where the maximum number of pixels adding a signal charge is four of photosensitive pixels. The maximum number of pixels adding the signal charge is properly selectable from natural numbers more than 2.

The solid-state imaging device of FIG. 17 is the same as that shown in FIG. 1 in the following point. Specifically, the analog shift register 13 is divided into two transfer stages including first and second transfer stages 13-1 and 13-2. However, the solid-state imaging device of FIG. 17 differs from that shown in FIG. 1 in the following point. The final transfer 13-3 including the final transfer electrode separating from the second transfer stage 13-2 is omitted.

Figure 18:
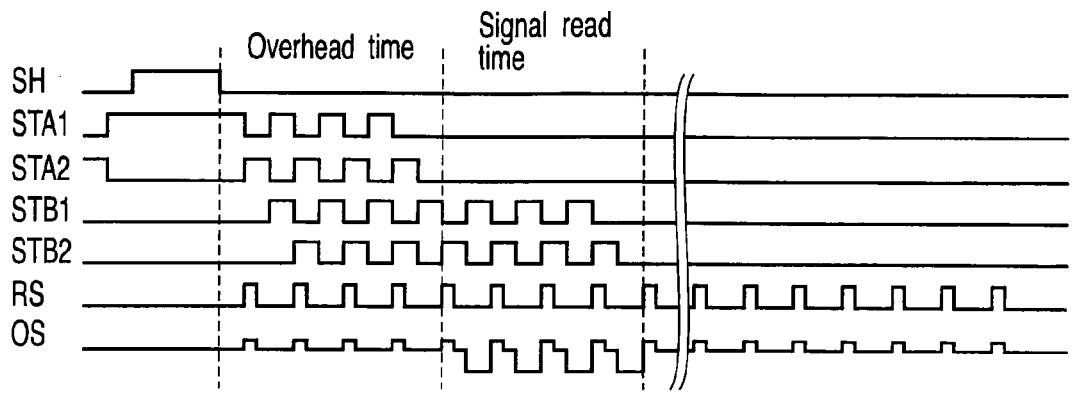
FIG. 18 is a read operation timing chart of high resolution in the solid-state imaging device shown in FIG. 17.
Figure 19:
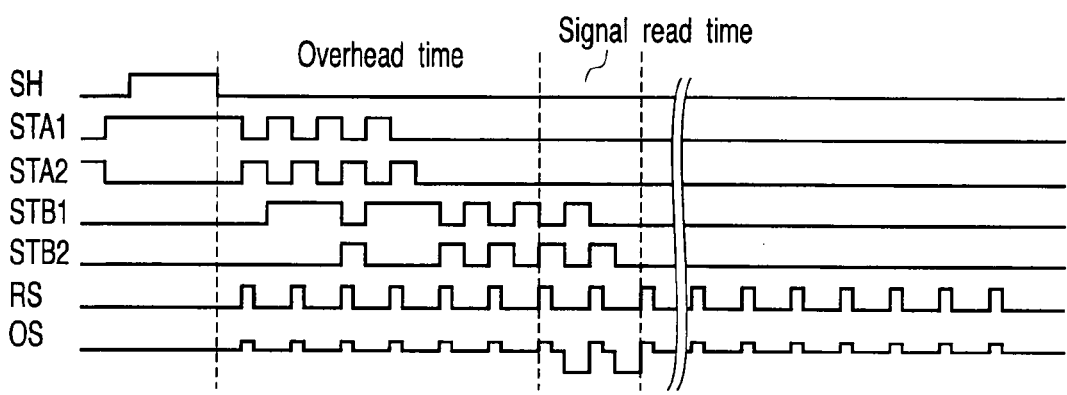
FIG. 19 is a read operation timing chart of intermediate resolution in the solid-state imaging device shown in FIG. 17.
Figure 20:
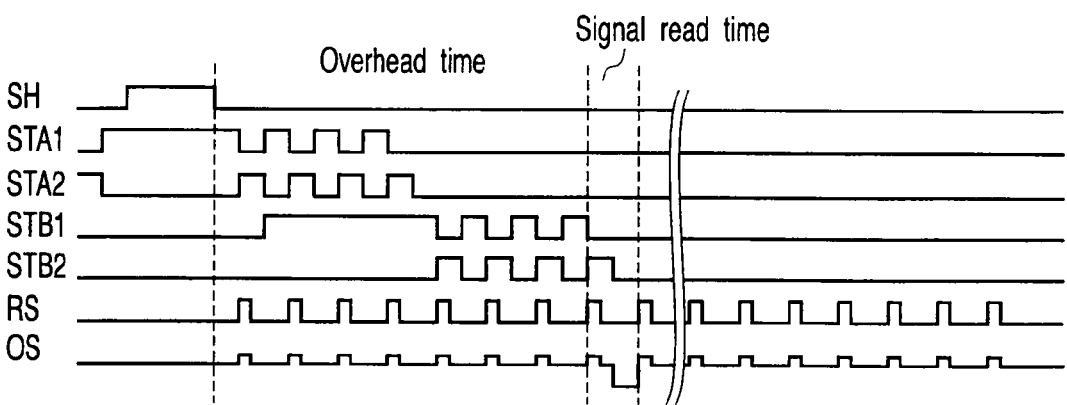
FIG. 20 is a read operation timing chart of low resolution in the solid-state imaging device shown in FIG. 17.

FIGS. 18 to 20 are read operation timing charts in the solid-state imaging device shown in FIG. 17. FIG. 18 shows the case of the high resolution read carrying out read using no addition. FIG. 19 shows the case of the intermediate resolution read carrying read using addition for two pixels. FIG. 20 shows the case of the low resolution read carrying read using addition for four pixels. The operation shown in these timing charts only differs from those shown in FIG. 4 to FIG. 6 in that the final transfer 13-3 is not driven. Thus, the explanation is omitted.

In the solid-state imaging device of FIG. 17, the same effect as the first embodiment is obtained, and further, the final transfer 13-3 is omitted. Therefore, the number of drive pulse signals (e.g., fifth pulse signal STZ) is reduced as compared with the first embodiment. As a result, this serves to simplify the configuration of the control signal generation circuit.

Third Embodiment

Figure 21:
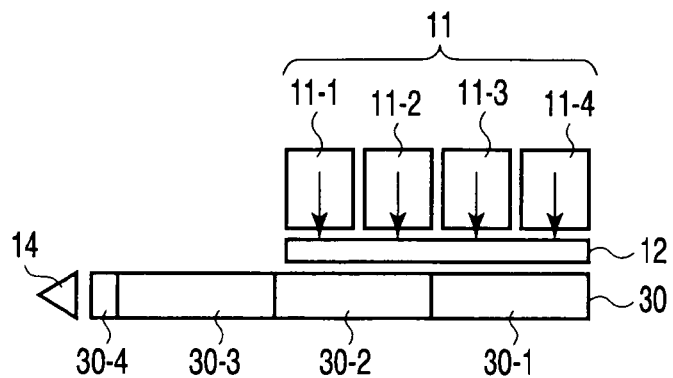
FIG. 21 is a block diagram schematically showing the configuration of a solid-state imaging device according to a third embodiment.

FIG. 21 is a block diagram schematically showing the configuration of a solid-state imaging device according to a third embodiment. FIG. 21 shows the configuration of a unit circuit of the solid-state imaging device in the case where the number of pixels adding a signal charge of some cells is four pixels to the maximum.

A pixel column 11 is composed of four cells 11-1 to 11-4, which each photo-electrically convert incident light. These four cells 11-1 to 11-4 are lineally arrayed. A shift gate 12 is arranged to be adjacent to the pixel column 11. Signal charges stored in cells 11-1 to 11-4 are transferred to an analog shift register 30 via the shift gate 12. The analog shift register 30 transfers the signal charges to one direction. The analog shift register 30 has a plurality of transfer electrodes, and divided into several transfer stages. The divided several transfer stages are each driven by an independent drive signal every transfer. According to the third embodiment, the analog shift register 30 is divided into three transfer stages, that is, first transfer stage 30-1, second transfer stage 30-2 and third transfer 30-3. The signal charges stored in cells 11-1 to 11-4 are transferred to the first and second transfer stages 30-1 and 30-2 via the shift gate 12 in a state of being equally divided.

The end portion of the analog shift register 30 is provided with an output unit 14. The output unit 14 detects the signal charge transferred from the analog shift register 30 to convert it into an output signal. A final transfer 30-4 is provided between the third transfer 30-3 adjacent to the output unit 14 and the output unit 14. The final transfer 30-4 is configured in such a manner that a transfer electrode of the third transfer stage 30-3 is separated.

Figure 22:
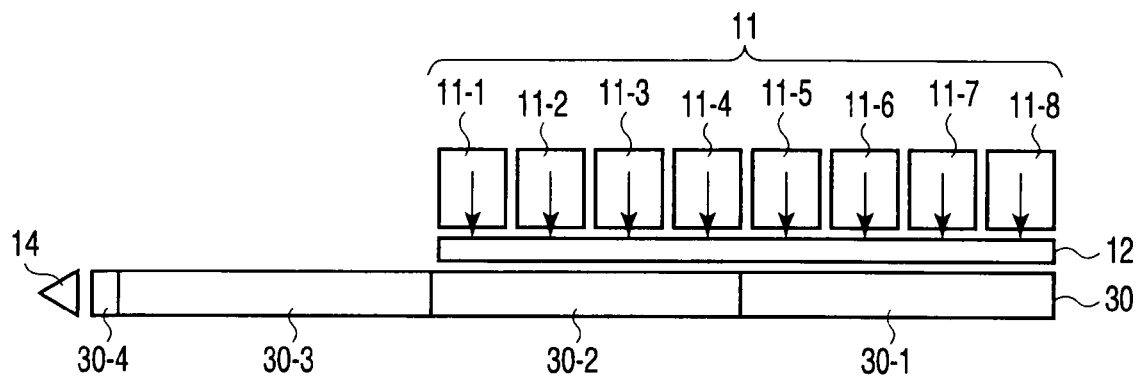
FIG. 22 is block diagram showing the configuration of a unit circuit of a solid-state imaging device according to a first modification example of the third embodiment.

FIG. 22 shows the configuration of a unit circuit of a solid-state imaging device according to a first modification example of the third embodiment. The solid-state imaging device of FIG. 21 shows the case where the maximum number of pixels adding a signal charge is four pixels. According to this modification example, the maximum number of pixels adding a signal charge is eight pixels. The unit circuit of FIG. 22 differs from FIG. 21 in that a pixel column 11 is composed of lineally arrayed eight cells 11-1 to 11-8. In this case, signal charges stored in eight cells 11-1 to 11-8 are transferred to the first and second transfer stages 30-1 and 30-2 of the analog shift register 30 via the shift gate 12 in a state of being equally divided.

Figure 23:
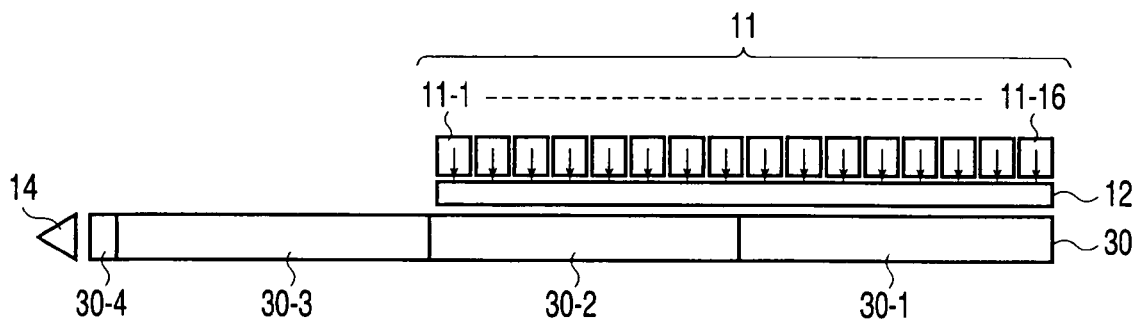
FIG. 23 is block diagram showing the configuration of a unit circuit of a solid-state imaging device according to a second modification example of the third embodiment.

FIG. 23 shows the configuration of a unit circuit of a solid-state imaging device according to a second modification example of the third embodiment. The solid-state imaging device of FIG. 23 shows the case where the maximum number of pixels adding a signal charge is 16. The unit circuit of FIG. 23 differs from FIG. 21 in that a pixel column 11 is composed of lineally arrayed 16 cells 11-1 to 11-16. In this case, signal charges stored in 16 cells 11-1 to 11-16 are transferred to the first and second transfer stages 30-1 and 30-2 of the analog shift register 30 via the shift gate 12 in a state of being equally divided.

Figure 24:
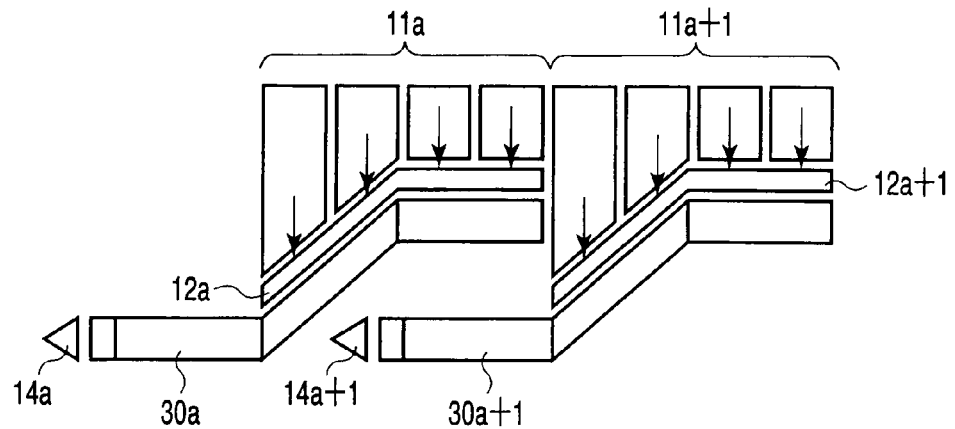
FIG. 24 is a block diagram showing the configuration of a solid-state imaging device in which a plurality of unit circuits shown in FIG. 21 is arrayed.

FIG. 24 shows a solid-state imaging device in which a plurality of the unit circuits shown in FIG. 21 (two in this embodiment) is arrayed. In FIG. 24, reference numerals 11a and 11a+1 denote pixel columns, 12a and 12a+1 denote shift gates. Further, 30a and 30a+1 denote analog shift registers, and 14a and 14a+1 denote output units.

One unit circuit is composed of the pixel column 11a, the shift gate 12a, the analog shift register 30a and the output unit 14a. The shift gate 12a is arranged to be adjacent to the pixel column 11a. A signal charge is transferred to the analog shift register 30a via the shift gate 12a. The output unit 14 converts the signal charge transferred from the analog shift register 30a. Likewise, another unit circuit is composed of the pixel column 11a+1, the shift gate 12a+1, the analog shift register 30a+1 and the output unit 14a+1. The shift gate 12a+1 is arranged to be adjacent to the pixel column 11a+1. A signal charge is transferred to the analog shift register 30a+1 via the shift gate 12a+1. The output unit 14+1 converts the signal charge transferred from the analog shift register 30a+1.

Figure 25:
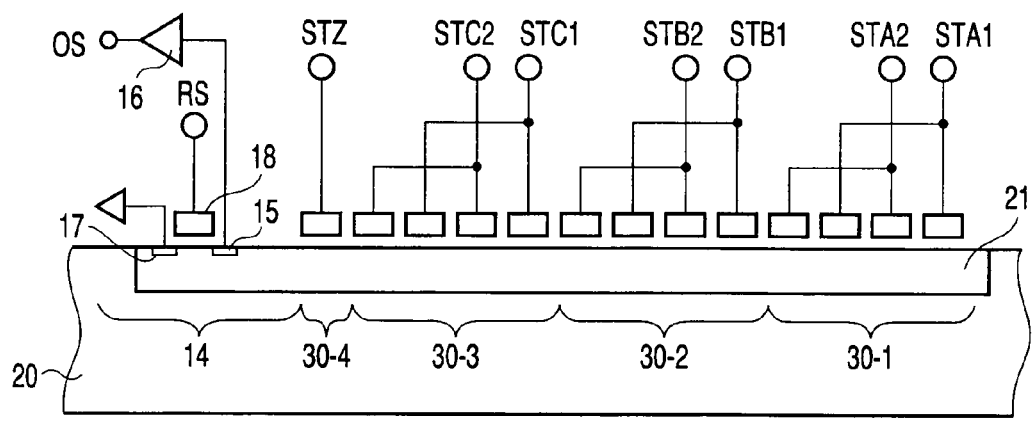
FIG. 25 is a cross-sectional view schematically showing the device structure of an analog shift register and an output unit shown in FIG. 21.

FIG. 25 is a cross-sectional view schematically showing the device structure of the analog shift register 30 and the output unit 14 shown in FIG. 21. As illustrated in FIG. 25, first to third transfer stages 30-1 to 30-3 of the analog shift register 30 are formed on the same channel 21 formed on the surface of a semiconductor substrate 20. The first transfer stage 30-1 is provided with two pairs of transfer electrodes. One pair of transfer electrodes are formed on the channel 21 via an insulating film, and supplied with a first drive pulse signal STA1. Another pair of transfer electrodes are formed on the channel 21 via an insulating film, and arranged to be adjacent to the foregoing one pair of transfer electrodes, and further, supplied with a second drive pulse signal STA2.

The second transfer stage 30-2 is provided with two pairs of transfer electrodes. One pair of transfer electrodes are formed on the channel 21 via an insulating film, and supplied with a third drive pulse signal STB1. Another pair of transfer electrodes are formed on the channel 21 via an insulating film, and arranged to be adjacent to the foregoing one pair of transfer electrodes, and further, supplied with a fourth drive pulse signal STB2.

Likewise, the third transfer stage 30-3 is provided with two pairs of transfer electrodes. One pair of transfer electrodes are formed on the channel 21 via an insulating film, and supplied with a fifth drive pulse signal STC1. Another pair of transfer electrodes are formed on the channel 21 via an insulating film, and arranged to be adjacent to the foregoing one pair of transfer electrodes, and further, supplied with a sixth drive pulse signal STC2.

In the first to third transfer stages 30-1 to 30-3, a pair of mutually neighboring transfer electrodes supplied with different drive pulse signal form one transfer. In the analog shift register shown in FIG. 25, a signal charge is added to change resolution. Thus, the number of transfer electrodes of the third transfer stage 30-3 is set to four or more (four in this embodiment) to secure the number of charges required for obtaining highest resolution.

A final transfer 40-4 is provided with one transfer electrode, which is formed on the channel 21 via an insulating film, and supplied with a seventh drive pulse signal STZ.

The output unit 14 is composed of a floating diffusion region 15 and an output buffer 16. The floating diffusion region 15 is formed in the channel 21 to be adjacent to the final transfer 30-4. The output buffer 16 is connected to the floating diffusion region 15. The channel 21 is formed with a drain diffusion region 17, which discharges a signal charge after read in a state of being separated from the floating diffusion region 15. A reset gate electrode 18 is provided on the channel 21 between the floating and drain diffusion regions 15 and 17.

The reset gate electrode 18 controls the discharge of the signal charge.

Figure 26:
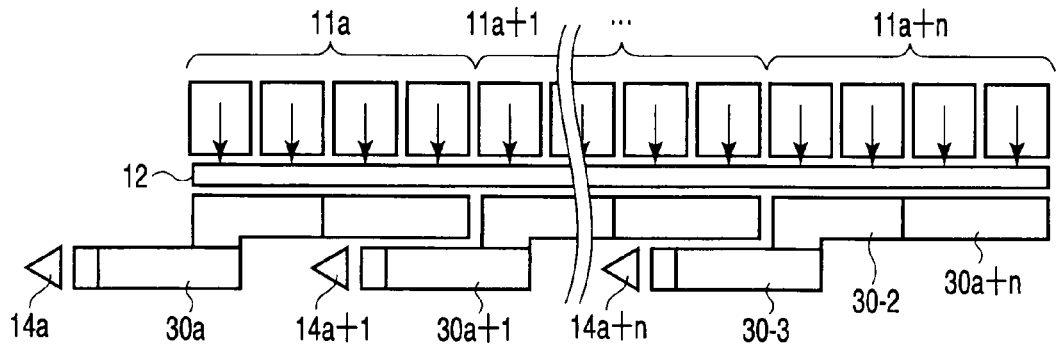
FIG. 26 is block diagram showing the configuration of a unit circuit of a solid-state imaging device according to a third modification example of the third embodiment.

FIG. 26 shows the configuration of a solid-state imaging device according to a third modification example of the third embodiment. The solid-state imaging device is configured in such a manner that a plurality of unit circuits shown in FIG. 21 (n+1) is arrayed. Symbols "a" to "a+n" shown in the final end of the number given in FIG. 23 are attached to the portions corresponding to FIG. 21, and thus, the explanation is omitted.

In the foregoing solid-state imaging device of FIG. 24, pixel is partially extended so that neighboring cells are not overlapped. A light shield film such as A1 partially exists. This is because opening area receiving incident light is equally set in any pixels.

In the solid-state imaging device of FIG. 26, the same planer shape is used in each cell. A pattern layout of each analog shift register 30 is designed so that neighboring cells are not overlapped. Specifically, in the solid-state imaging device of FIG. 24, part of each analog shift register 30 is obliquely arrayed. On the contrary, in solid-state imaging device of FIG. 26, the second transfer stage 30-2 is formed into an L-letter shape so that the second and third transfer stages 30-2 and 30-3 of each analog shift register 30 are connected in a state of being parallel to each other. In the solid-state imaging device according to this modification example, one shift gate 12 is provided in common with respect to a plurality of pixel columns 11. In this case, as shown in FIG. 24, one shift gate 12 may be independently provided with respect to each of the pixel columns 11.

Figure 27:
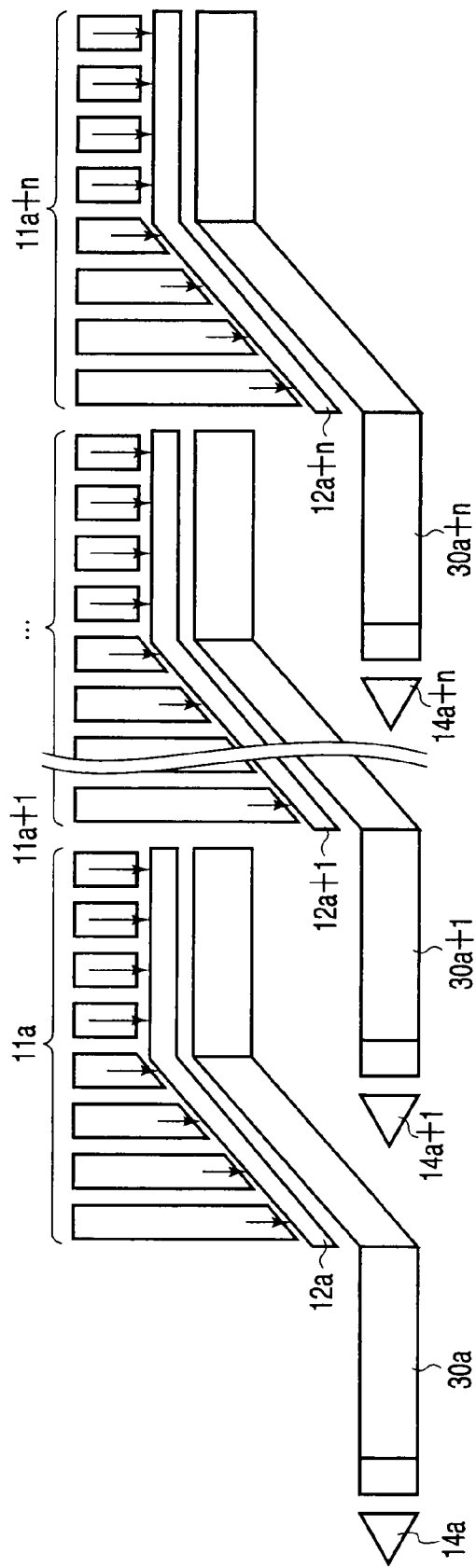
FIG. 27 is block diagram showing the configuration of a unit circuit of a solid-state imaging device according to a fourth modification example of the third embodiment.

FIG. 27 shows the configuration of a solid-state imaging device according to a fourth modification example of the third embodiment. The solid-state imaging device is configured in such a manner that a plurality of unit circuits each having a pixel column including eight cells shown in FIG. 22 (n+1) is arrayed. Symbols "a" to "a+n" shown in the final end of the number given in FIG. 23 are attached to the portions corresponding to FIG. 21, and thus, the explanation is omitted.

Figure 28:
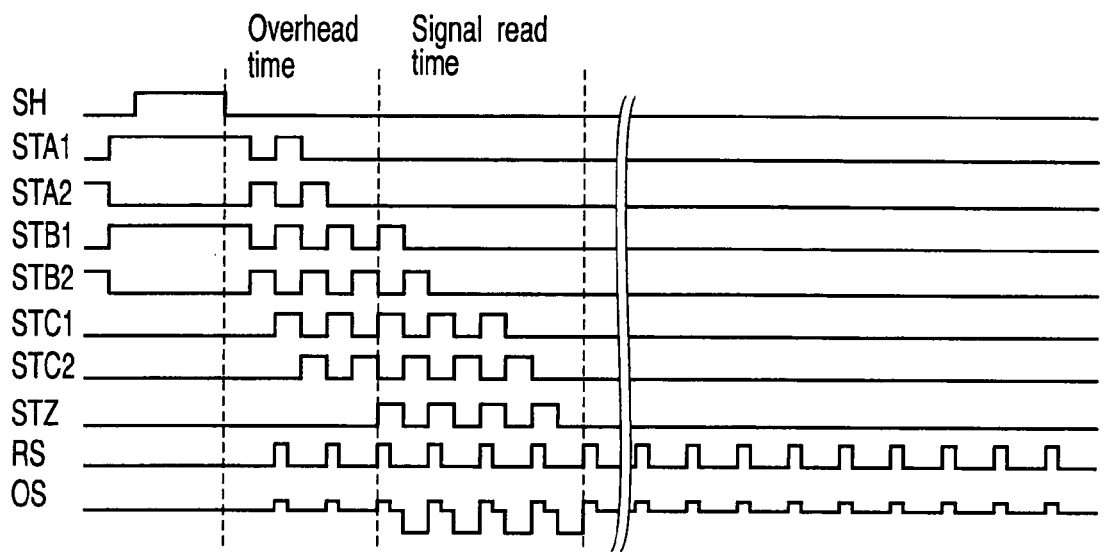
FIG. 28 is a read operation timing chart of high resolution in the solid-state imaging device shown in FIG. 21.
Figure 29:
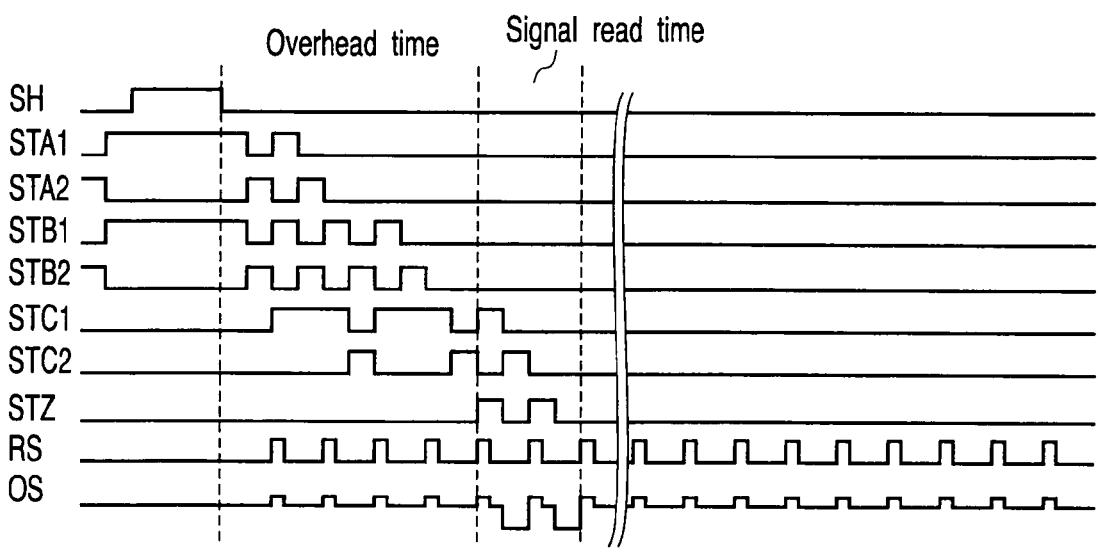
FIG. 29 is a read operation timing chart of intermediate resolution in the solid-state imaging device shown in FIG. 21.
Figure 30:
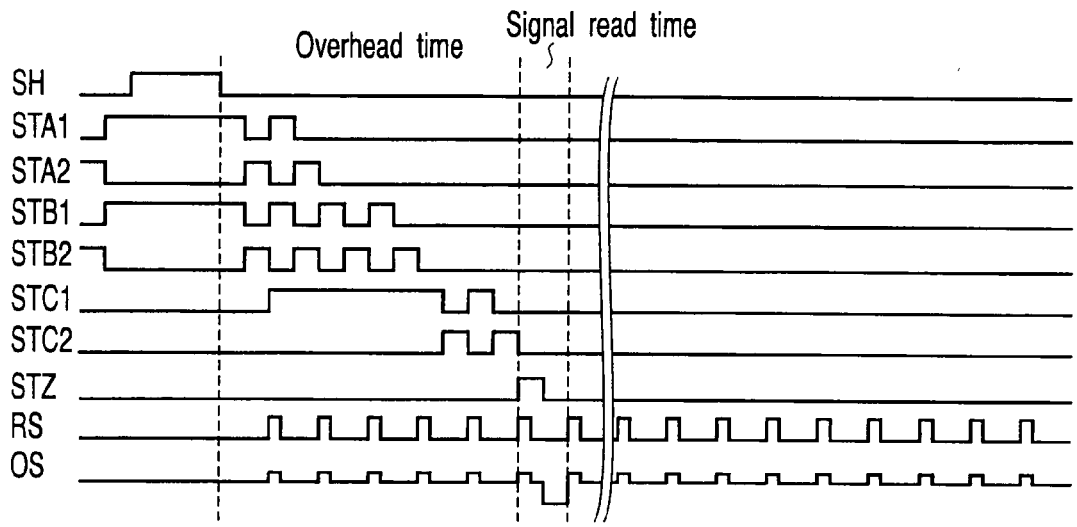
FIG. 30 is a read operation timing chart of low resolution in the solid-state imaging device shown in FIG. 21.

FIGS. 28 to 30 are read operation timing charts in the solid-state imaging device shown in FIG. 21. FIG. 28 shows the case of the high resolution read carrying out read using no addition. FIG. 29 shows the case of the intermediate resolution read carrying read using addition for two pixels. FIG. 30 shows the case of the low resolution read carrying read using addition for four pixels.

The operation shown in FIG. 28 to FIG. 30 differs from that shown in FIG. 4 to FIG. 6 in the following point. Signal charges generated in the pixel columns are transferred to the first and second transfer stages 30-1 and 30-2 of the analog shift register 30. The third transfer stage 30-3 carries out charge addition.

In the intermediate resolution, the following features are given as compared with the case of high resolution show in FIG. 28. Specifically, in the overhead time, each cycle of fifth and sixth drive pulse signals STC1 and STC2 supplied to the third transfer stage 30-3 is set to 1/L (L=2) of each cycle of first and second drive pulse signals STA1 and STA2 and third and fourth drive pulse signals STB1 and STB2 supplied to the first and second transfer stages 30-1 and 30-2. In the low resolution, the following features are given as compared with the case of high resolution show in FIG. 28. Specifically, in the overhead time, each cycle of fifth and sixth drive pulse signals STC1 and STC2 supplied to the third transfer stage 30-3 is set to 1/L (L=4) of each cycle of first and second drive pulse signals STA1 and STA2 and third and fourth drive pulse signals STB1 and STB2 supplied to the first and second transfer stages 30-1 and 30-2.

Figure 31:
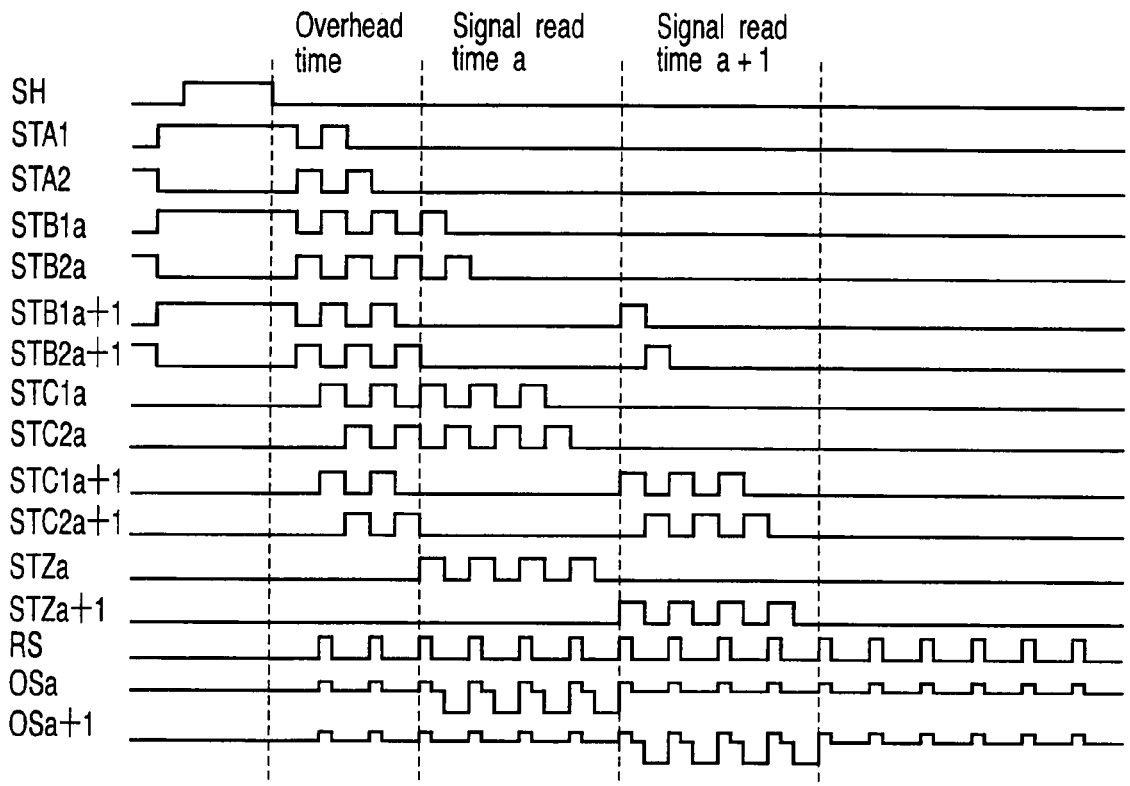
FIG. 31 is a read operation timing chart of high resolution in the solid-state imaging device shown in FIG. 24.
Figure 32:
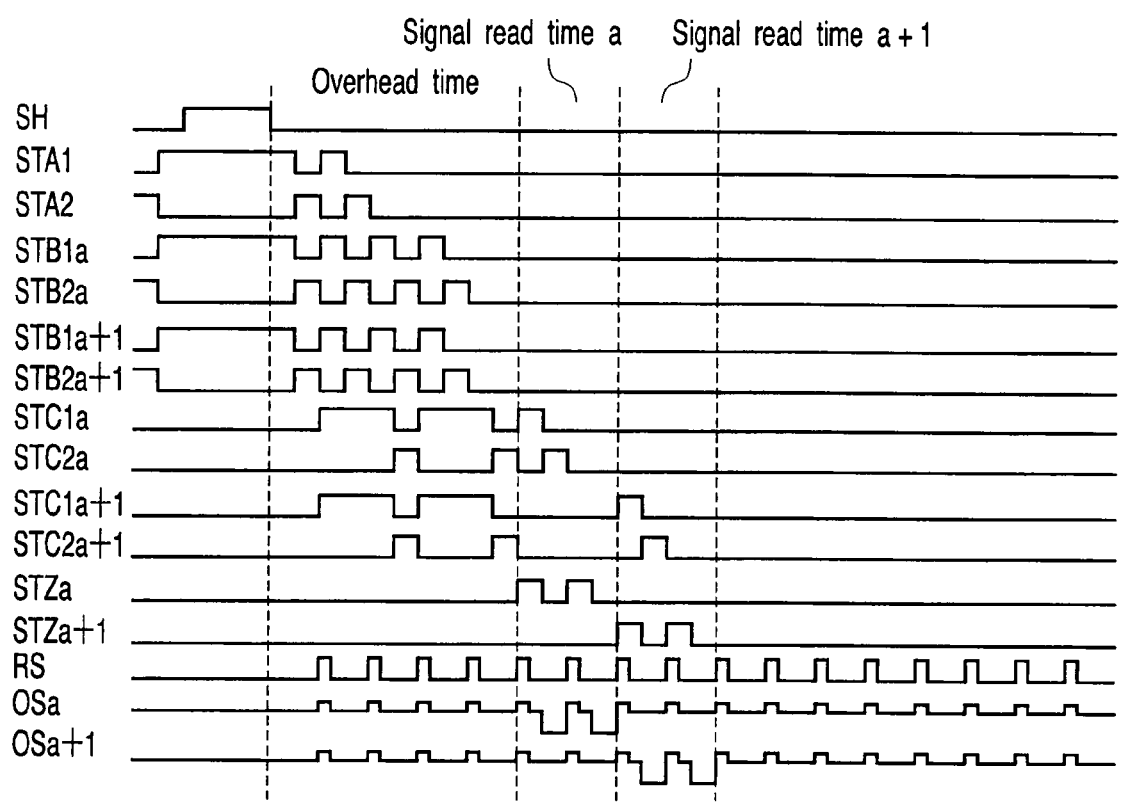
FIG. 32 is a read operation timing chart of intermediate resolution in the solid-state imaging device shown in FIG. 24.
Figure 33:
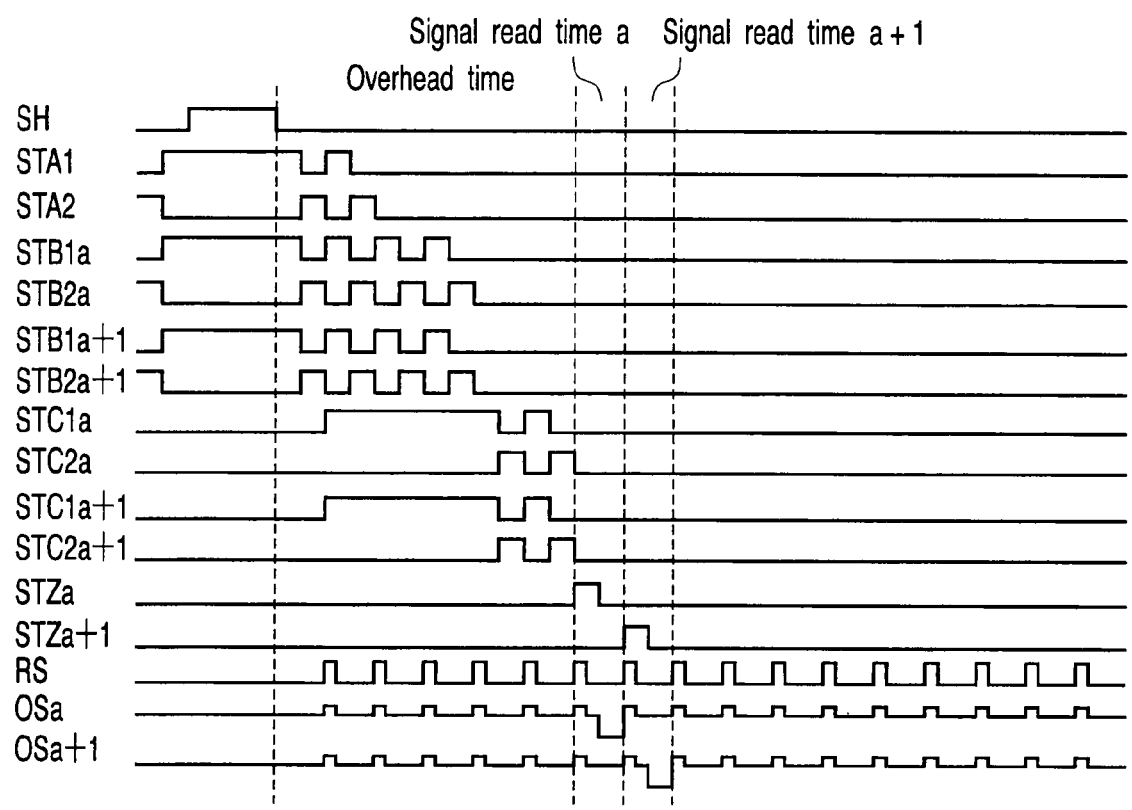
FIG. 33 is a read operation timing chart of low resolution in the solid-state imaging device shown in FIG. 24.
Figure 35:
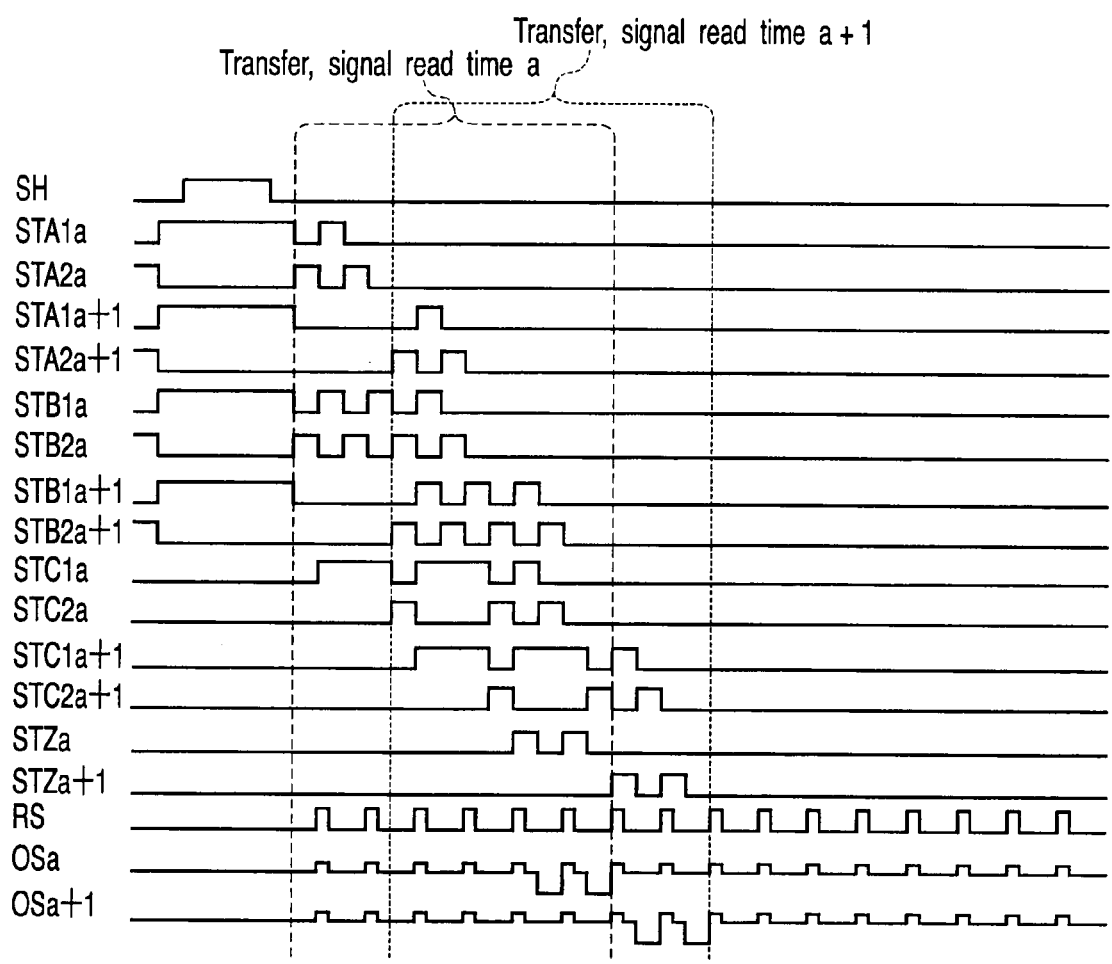
FIG. 35 is another intermediate resolution read operation timing chart in the solid-state imaging device shown in FIG. 24.
Figure 36:
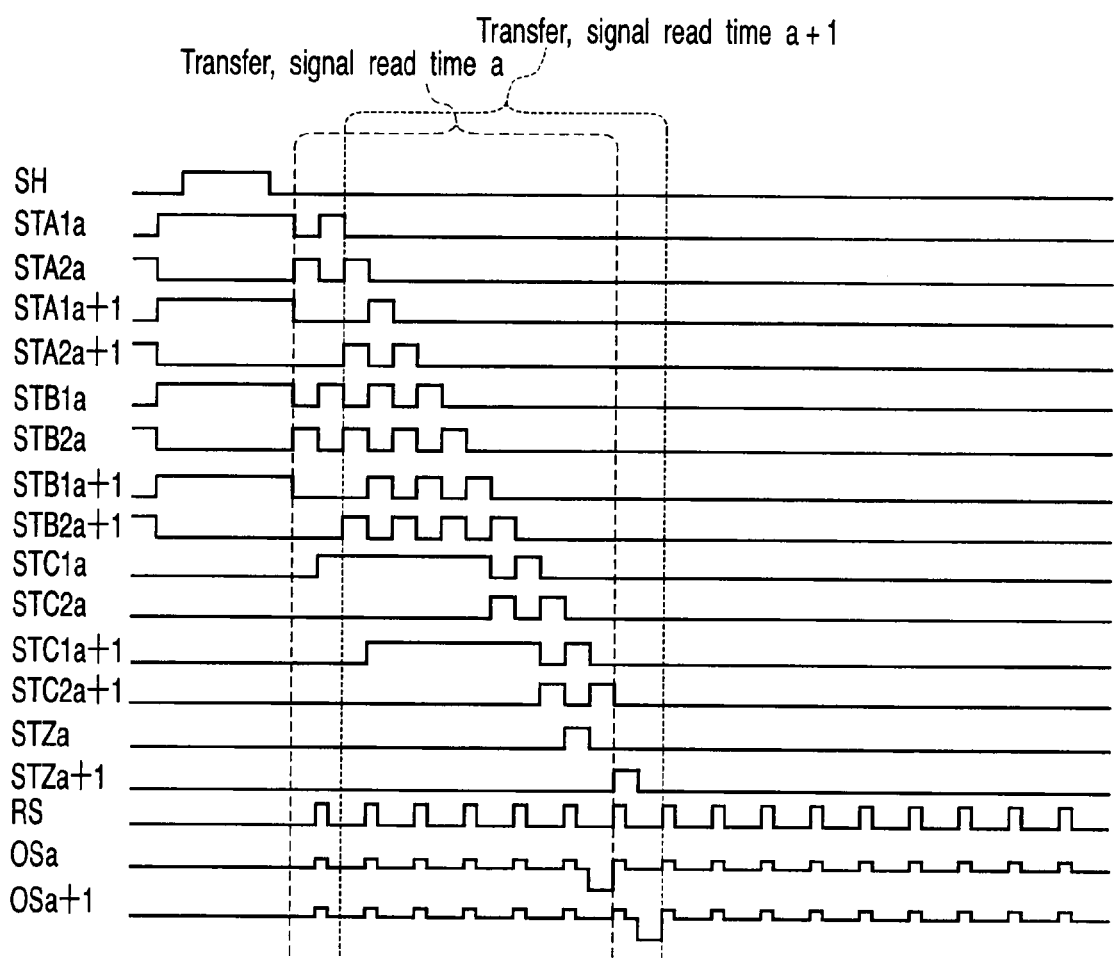
FIG. 36 is another low resolution read operation timing chart in the solid-state imaging device shown in FIG. 24.

FIGS. 31 to 33 and FIGS. 34 to 36 are each read operation timing charts in the solid-state imaging device of FIG. 24. FIG. 31 and FIG. 34 show the case of the high resolution read carrying out read using no addition. FIG. 32 and FIG. 35 show the case of the intermediate resolution read carrying read using addition for two pixels. FIG. 33 and FIG. 36 show the case of the low resolution read carrying read using addition for four pixels.

In the solid-state imaging device of FIG. 24, first transfer stages 30-1 of the analog shift registers 30a and 30a+1 are each concurrently supplied with first and second drive pulse signals STA1 and STA2. The second transfer stages 30-2 are each supplied with different third and fourth drive pulse signals STB1 and STB2. In FIG. 31 to FIG. 36, the third and fourth drive pulse signals are shown as STB1a, STB2a and STB1a+1, STB2a+1. The third transfer stages 30-3 are each supplied with different fifth and sixth drive pulse signals STC1 and STC2. In FIG. 31 to FIG. 36, the fifth and sixth drive pulse signals are shown as STC1a, STC2a and STC1a+1, STC2a+1. In the different unit circuit, the final transfer 30-4 is supplied with a different seventh drive pulse signal STZ. In FIG. 31 to FIG. 36, the seventh drive pulse signals are shown as STZa and STCZa+1. Output signals from the output units 14a and 14a+1 are shown as OSa and OSa+1.

In FIG. 31 to FIG. 33, transfer and addition of signal charges of all of arrayed cells are carried out in the overhead time. The signal charges are transferred to the final transfer, and thereafter, output every cell in the signal read time. On the contrary, in FIG. 34 to FIG. 36, signal charges read from the pixel column 11 are transferred to the analog shift register 30 via the shift gate 12, and thereafter, temporarily stored therein. Transfer an addition operations are successively carried out every cell read as a signal just before signal read.

The solid-state imaging device according to the third embodiment has the following advantage. The frequency (data rate) of the output signal OS in the signal read time is the same as the case of using no addition of signal charges (high resolution) without changing the drive frequency of the analog shift register 13 even if addition of signal charges is made (low/intermediate resolution).

The final transfer 30-4 of the analog shift register 30 is driven using a drive signal (i.e., seventh drive pulse signal STZ) different from the third transfer stage 30-3. By doing so, it is possible to prevent malfunction such as signal delay.

Moreover, the solid-state imaging device of FIG. 26 is provided with a plurality of unit circuits. The shift pulse signal SH supplied to each shift gate 12 is set to the same so that each shift gate 12 is controlled at the same timing. In this way, it is possible to keep the unity of charge storage time in all cells.

In the solid-state imaging device of the third embodiment, the analog shift register 30 is divided into some transfer stages (three in this embodiment). The cycle of the drive signal (fifth and sixth drive pulse signals STC1 and STC2) supplied to the third transfer stage 30-3 is changed. In this way, it is possible to readily change the resolution of the read signal.

In addition, when the analog shift register 30 transfers the signal charge, the signal charge is transferred to a horizontal direction to the arrangement direction of pixel column. Thus, the electrode length of each transfer electrode of the analog shift register 30 is shortened. Therefore, charges are readily transferred, and thus, this serves to prevent transfer failure.

Fourth Embodiment

Figure 37:
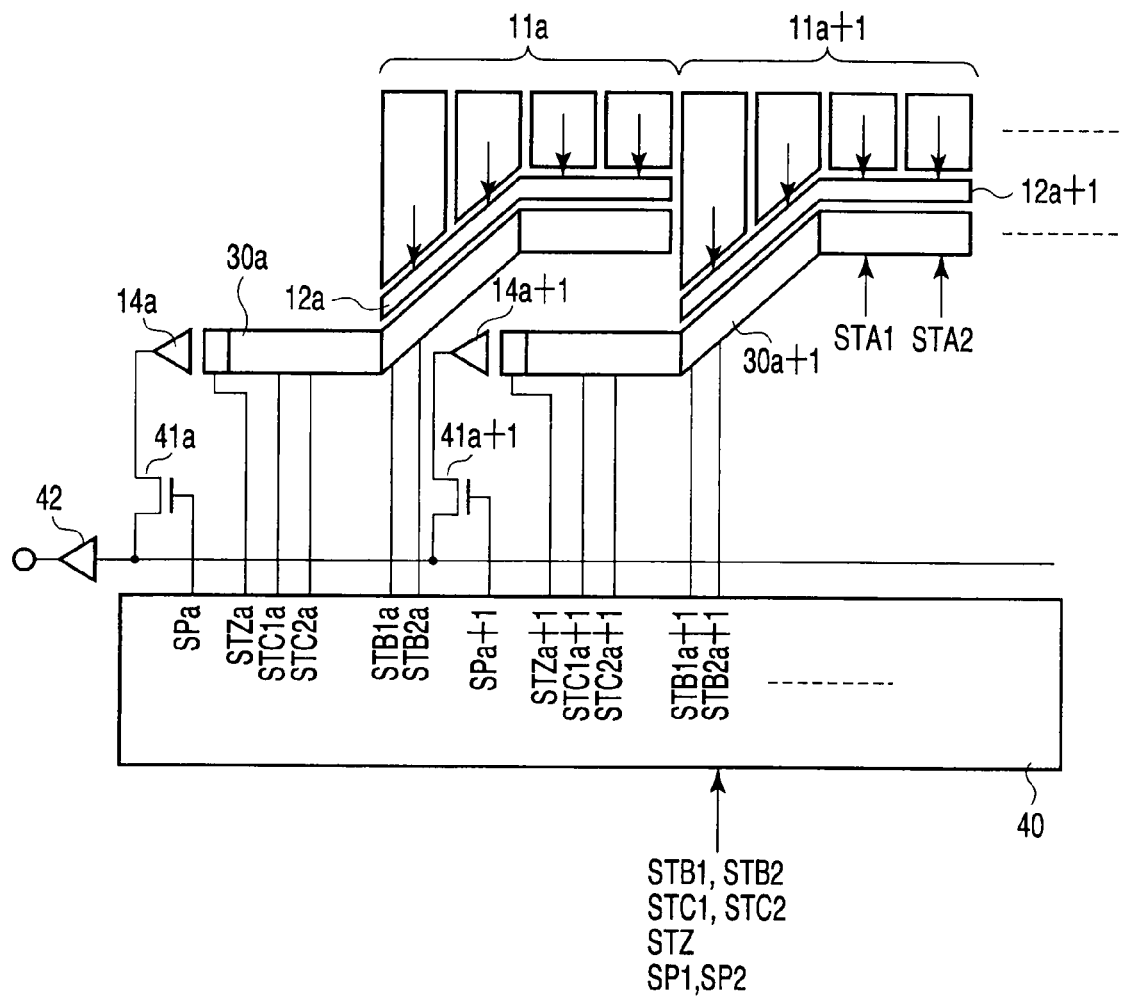
FIG. 37 is a block diagram schematically showing the configuration of a solid-state imaging device according to a fourth embodiment.

FIG. 37 is a block diagram schematically showing the configuration of a solid-state imaging device according to a fourth embodiment. The solid-state imaging device of FIG. 37 is configured in such a manner that a plurality of unit circuits shown in FIG. 21 is arrayed, like the solid-state imaging device shown in FIG. 26 and FIG. 27. In FIG. 37, reference numerals 11a, 11a+1, ... denote pixel columns, and 12a, 12a+1, ... denote shift gates. Further, 30a, 30a+1, ... denote analog shift registers, and 14a, 14a+1, ... denote output units. The fourth embodiment relates to the case where each of pixel columns 11a, 11a+1, ... includes four cells. In this case, each of pixel columns 11a, 11a+1, ... may be provided with eight or 16 cells.

In the foregoing solid-state imaging device of the third embodiment, the number of pixel columns increases, and also, the number of cells becomes much. For this reason, the number of drive signals for driving the analog shift register 30 increases. In addition, the output signal increases correspondingly to the number of pixel columns, for this reason, signal processing becomes complicated.

So, the fourth embodiment has the configuration of simply reading the output signal without increasing the number of drive pulse signals even if the number of cells is much. Specifically, the solid-state imaging device of the third embodiment is additionally provided with a control circuit 40 including a shift register, a plurality of first output select transistors 41a, 41a+1, ... and a buffer 42. In the solid-state imaging device shown in FIG. 37, an analog shift register 30 of each unit circuit is divided into three transfer stages. In this case, the analog shift register 30 of each unit circuit may be divided into two transfer stages, like the first embodiment.

The control circuit 40 is supplied with basic drive pulse signals STB1, STB2, STC1, STC2, STZ, SP1 and SP2 generated by the control signal generation circuit 100. Thus, the control circuit 40 outputs various drive pulse signals STB1a, STB1a+1, ... STB2a, STB2a+1, STC1a, STC1a+1, ... STC2a, STC2a+1, ... STZa, STZa+1, .... Spa, Spa+1, ... from these basic drive pulse signals. The output select transistors 41 are each interposed between the output units 14 and the buffer 42. These output select transistors 41 are each controlled according to drive pulse signals Spa, Spa+1, ... output from the control circuit 40.

Each first transfer stage of the analog shift registers 30 is driven in common according to drive pulse signals STA1 and STA2.

Figure 38:
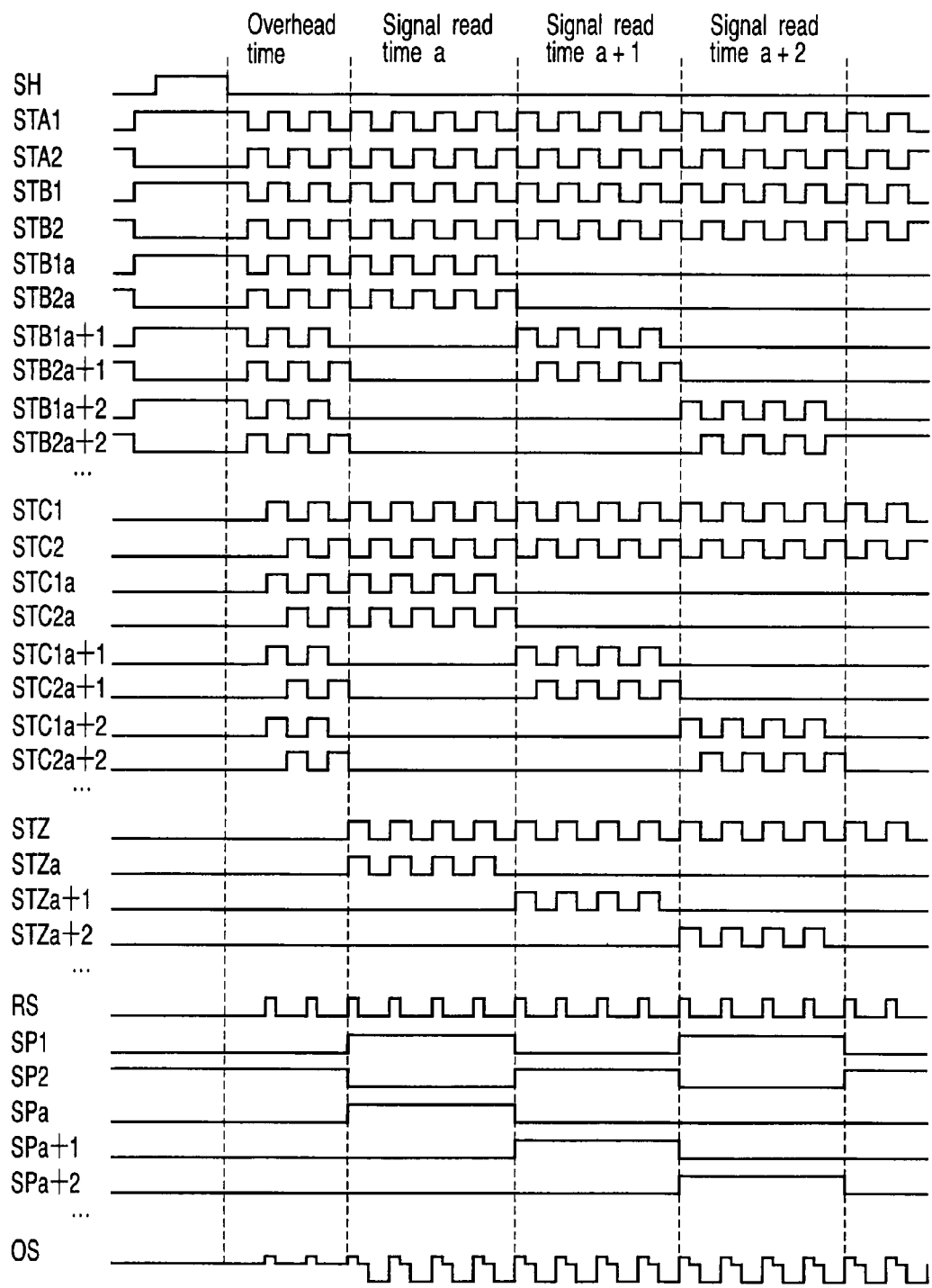
FIG. 38 is a read operation timing chart of high resolution in the solid-state imaging device shown in FIG. 37.
Figure 39:
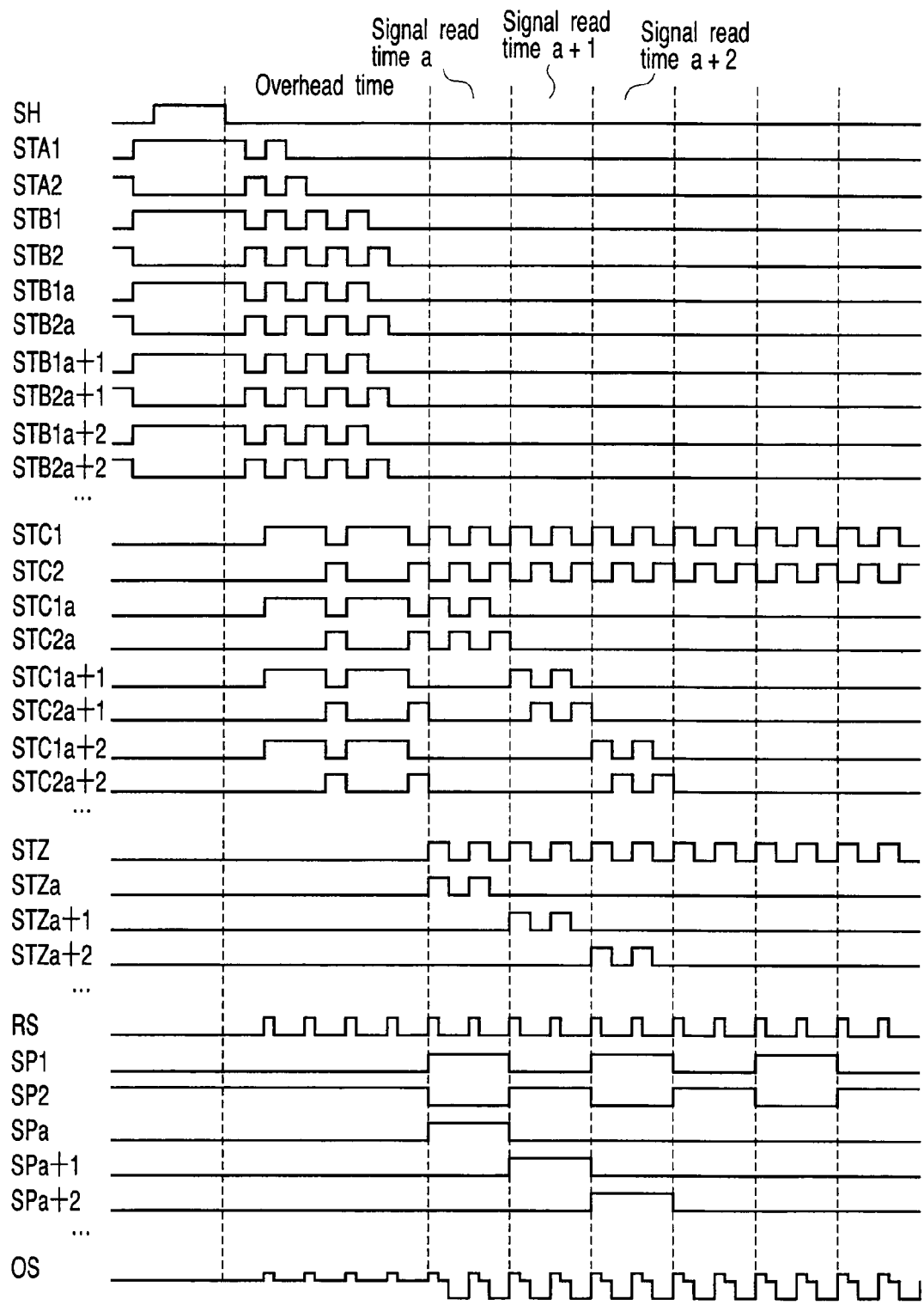
FIG. 39 is a read operation timing chart of intermediate resolution in the solid-state imaging device shown in FIG. 37.
Figure 40:
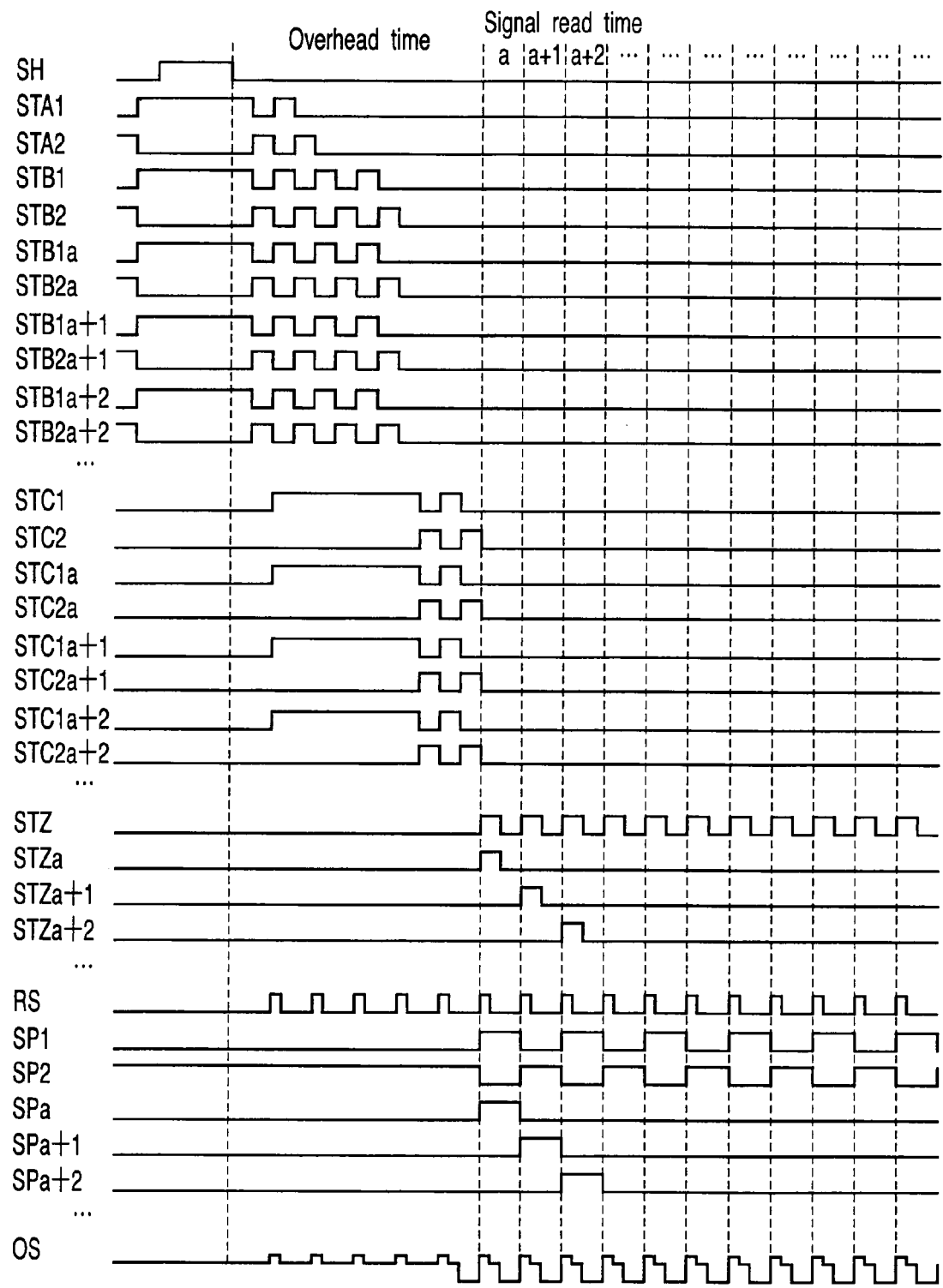
FIG. 40 is a read operation timing chart of low resolution in the solid-state imaging device shown in FIG. 37.

FIGS. 38 to 40 are read operation timing charts in the solid-state imaging device shown in FIG. 37. As described before, one transfer is composed of two transfer electrodes, and thus, the analog shift register is driven according two-phase drive.

FIG. 38 is a high resolution timing chart using no charge addition. In the overhead time, cell signal charges of all pixel columns 11 are transferred to the final transfer of the third transfer stage 30-3 of each analog shift register 30. In the next signal read time a, the signal charge of each cell of the first pixel column 11a is successively transferred to the output unit 14a via the final transfer 30-4. In the signal read time a, the drive pulse signal SPa only is set to high level. Thus, the output select transistor 41a turns on, and then, an output from the output unit 14a is fetched as an output signal OS via the buffer 42.

In the next read time a+1, the signal charges of each cell of the second pixel column 11a+1 are successively transferred to the output unit 14a+1 via the final transfer 30-4. In the signal read time a+1, the drive pulse signal SPa+1 only is set to high level, and thus, the output select transistor 41a+1 turns on. An output from the output unit 14a+1 is fetched as an output signal OS via the buffer 42. Hereinafter, the signal charges of each cell of the pixel column 11a+2 ... after the second pixel column are changed into a signal, and thus, fetched from the buffer 42 as an output signal OS in the same manner.

FIG. 39 shows an intermediate resolution read timing carrying out read using addition of charges equivalent to two pixels. In the overhead time, the signal charge is transferred from the second transfer stage 30-2 of each analog shift register 30 to the third transfer stage 30-3. In this case, the cycle of the signal STC is set to 1/L (L=2) with respect to the drive pulse signal STB. In this way, charges equivalent to two pixels are added by the transfer of the third transfer stage 30-3 adjacent to the second transfer 30-2. Thereafter, the header charge is transferred to the final transfer of the analog shift register 30. In the next signal read time a, the signal charges of each cell of the second pixel column 11a are successively transferred to the output unit 14a+1 via the final transfer 30-4. In the signal read time a, the drive pulse signal SPa+1 only is set to high level, and thus, the output select transistor 41a+1 turns on. An output from the output unit 14a is fetched as an output signal OS via the buffer 42.

In the next read time a+1, the signal charges of each cell of the second pixel column 11a+1 are added every two pixel while being successively transferred to the output unit 14a+1 via the final transfer 30-4. In the signal read time a+1, the drive pulse signal SPa+1 only is set to high level. Thus, the output select transistor 41a+1 turns on, and then, an output from the output unit 14a+1 is fetched as an output signal OS via the buffer 42. Hereinafter, the signal charges of each cell of the pixel column 11a+2 after the second pixel column are added every two pixels while being transferred, and changed into a signal. Thus, the signal charges are fetched from the buffer 42 as an output signal OS in the same manner.

FIG. 40 shows a low resolution read timing chart carrying out addition of charges equivalent to four pixels. In FIG. 40, in the overhead time, the signal charge is transferred from the second transfer stage 30-2 of each analog shift register 30 to the third transfer stage 30-3. In this case, the cycle of the signal STC is set to 1/L (L=4) with respect to the drive pulse signal STB. This is the point different from FIG. 39.

The solid-state imaging device according to the fourth embodiment has the following advantage. The frequency (data rate) of the output signal OS in the signal read time is the same as the case of using no addition of signal charges (high resolution) without changing the drive frequency of the analog shift register 30 even if addition of signal charges is made (low/intermediate resolution).

The final transfer 30-4 of the analog shift register 30 is driven using a drive signal (i.e., seventh drive pulse signal STZ) different from the third transfer stage 30-3. By doing so, it is possible to prevent malfunction such as signal delay.

Moreover, the solid-state imaging device of FIG. 26 is provided with a plurality of unit circuits. The shift pulse signal SH supplied to each shift gate 12 is set to the same so that each shift gate 12 is controlled at the same timing. In this way, it is possible to keep the unity of charge storage time in all cells.

In the solid-state imaging device of the fourth embodiment, the analog shift register 30 is divided into some transfer stages (three in this embodiment). The cycle of the drive signal (fifth and sixth drive pulse signals STC1 and STC2) supplied to the third transfer stage 30-3 is changed. In this way, it is possible to readily change the resolution of the read signal.

In addition, when the analog shift register 30 transfers the signal charge, the signal charge is transferred to a horizontal direction to the arrangement direction of pixel column. Thus, the electrode length of each transfer electrode of the analog shift register 30 is shortened. Therefore, charges are readily transferred, and thus, this serves to prevent transfer failure.

Fifth Embodiment

Figure 41:
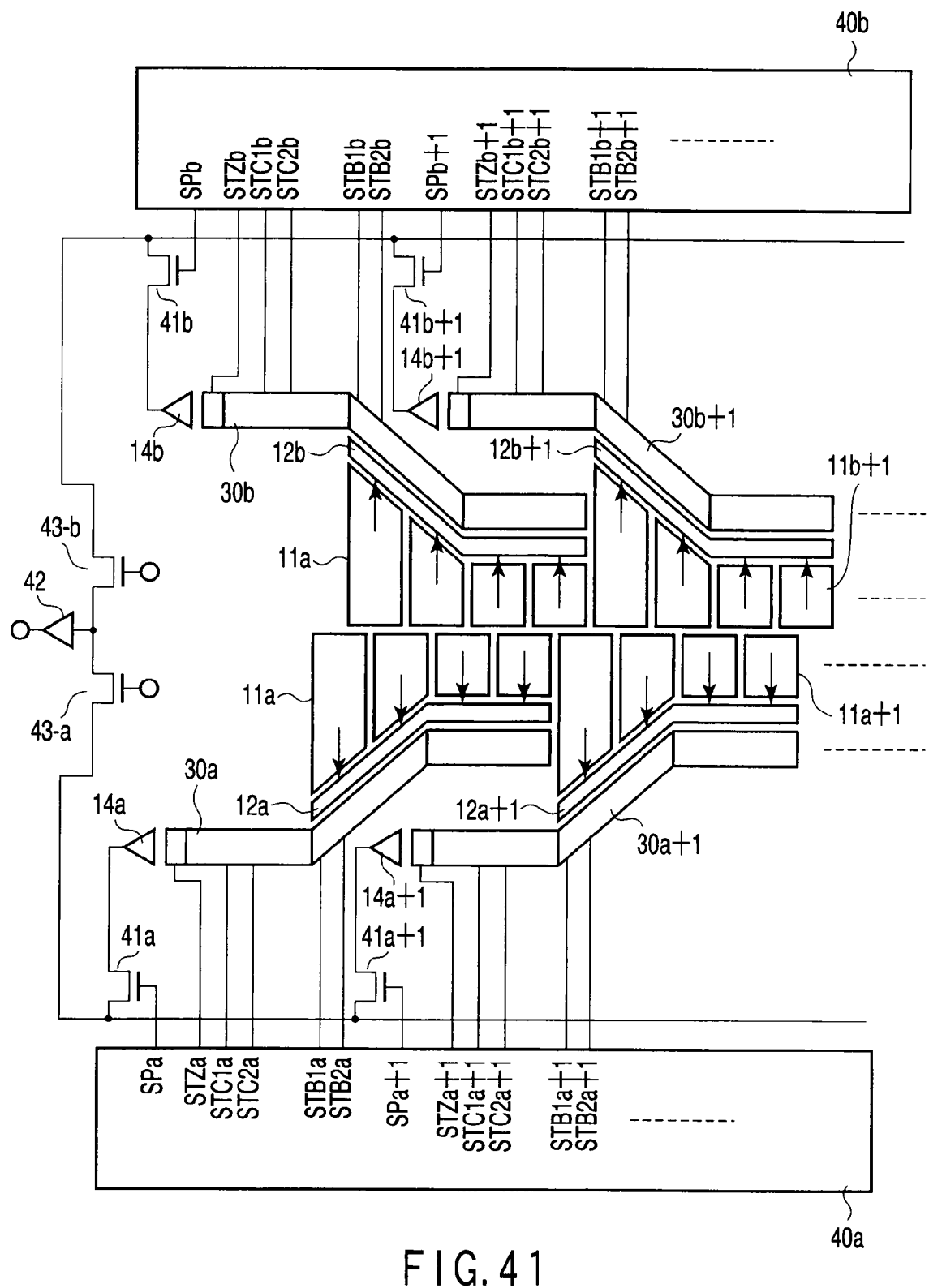
FIG. 41 is a block diagram schematically showing the configuration of a solid-state imaging device according to a fifth embodiment.

FIG. 41 is a block diagram schematically showing the configuration of a solid-state imaging device according to a fifth embodiment. The solid-state imaging device of FIG. 41 has the following configuration features. Specifically, a plurality of pixel columns is arrayed two lines so that the pixel columns including several cells are arranged in a shape of zigzag. For example, a plurality of pixel columns 11a, 11a+1 ... arrayed on the lower side is arranged in a state of being shifted by ½ of each pixel pitch or a value close to ½ with respect to a plurality of pixel columns 11b, 11b+1 ... arrayed on the upper side. In this way, cells are arrayed in a shape of zigzag as a whole.

In FIG. 41, shift gates corresponding to a plurality of pixel columns 11a, 11a+1 ... arrayed on the lower side are shown by reference numerals 12a, 12a+1, .... Reference numerals 30a, 30a+1 denote analog shift registers. Reference numerals 14a, 14a+1, ... denote output units, and 41a, 41a+1, denote first output select transistors. A control circuit corresponding to the control circuit 40 shown in FIG. 37 is shown by a reference numeral 40a. Likewise, in FIG. 41, shift gates corresponding to a plurality of pixel columns 11b, 11b+1 ... arrayed on the upper side are shown by reference numerals 12b, 12b+1, .... Reference numerals 30b, 30b+1 ... denote analog shift registers. Reference numerals 14b, 14b+1, ... denote output units. Reference numerals 41b, 41b+1, ... denote first output select transistors. A control circuit corresponding to the control circuit 40 shown in FIG. 37 is shown by a reference numeral 40b.

The solid-state imaging device of FIG. 41 is provided with a second output select transistor 43-a. The second output select transistor 43-a is interposed between the first output select transistors 41a, 41a+1, ... and the buffer 42. The transistor 43-a is turned on when the signal charges are read from the pixel columns 11a, 11a+1, ... arrayed on the lower side. The solid-state imaging device of FIG. 41 is further provided with a second output select transistor 43-b. The second output select transistor 43-b is interposed between the first output select transistors 41b, 41b+1, ... and the buffer 42. The transistor 43-b is turned on when the signal charges are read from the pixel columns 11b, 11b+1, ... arrayed on the upper side.

Switching of the second output select transistors 43-a and 43-b is controlled in the following manner. Specifically, the control may be made so that transistors 43-a and 43-b are alternately turned on every read from each pixel including the added signal. Moreover, the control may be made so that these transistors are alternately turned on every predetermined period so that an output signal is obtained every pixel line.

In the solid-state imaging device of the fifth embodiment, the same effect as the fourth embodiment is obtained. Cells are arrayed in a shape of zigzag; therefore, this serves to further improve resolution.

Sixth Embodiment

Figure 42:
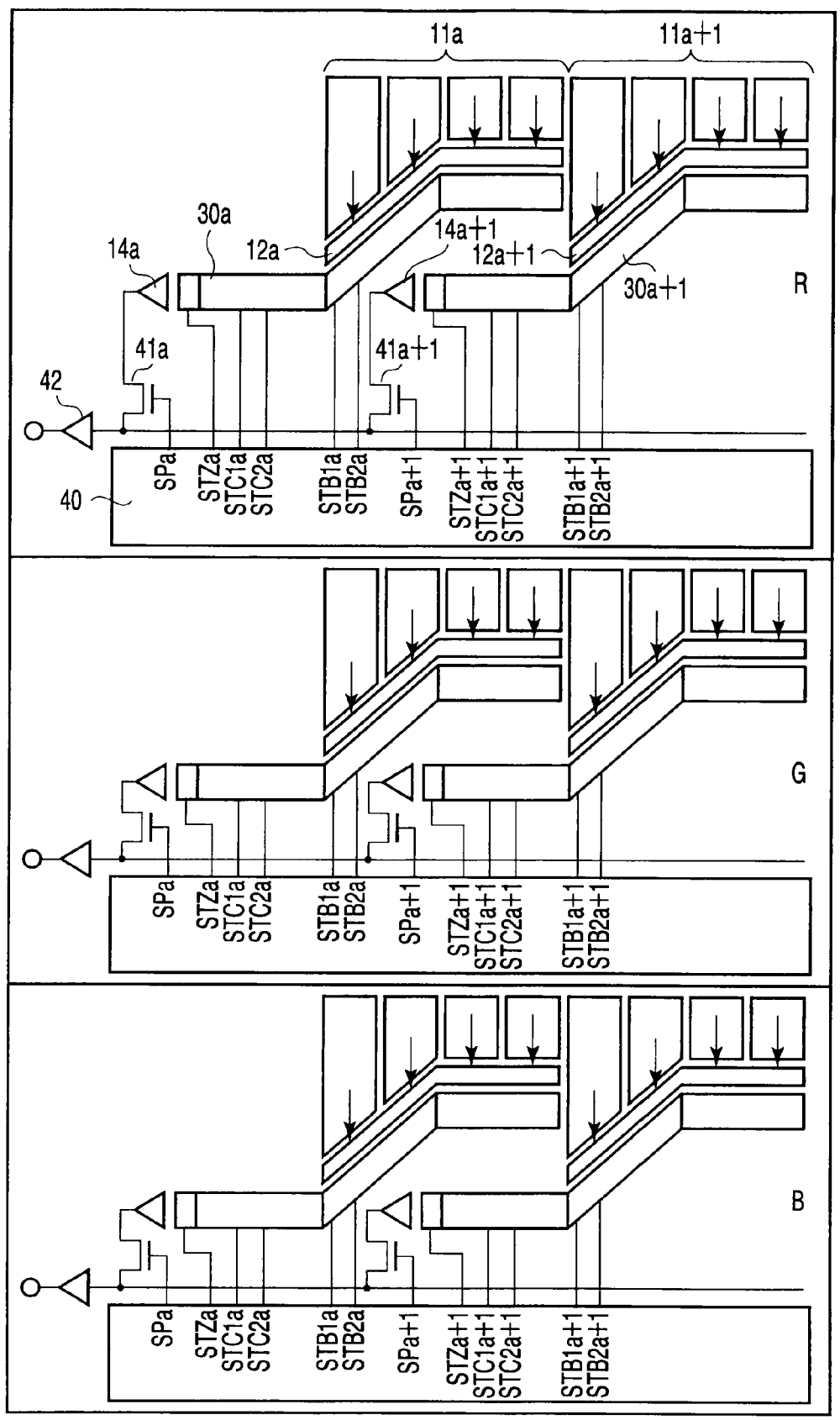
FIG. 42 is a block diagram schematically showing the configuration of a solid-state imaging device according to a sixth embodiment.

FIG. 42 is a block diagram schematically showing the configuration of a solid-state imaging device according to a sixth embodiment. In general, a linear image sensor is provided with three pixel column for reading a color document. Red, green and blue color filters are placed on the pixel of each column. Further, four columns are provided in total, that is, one monochrome column is provided in addition to the three columns.

The solid-state imaging device of the present invention can employ the same arrangement as above, and therefore, is applicable to a general color linear image sensor. FIG. 42 shows the case where the solid-state imaging device of the present invention is applied to a linear image sensor. The solid-state imaging device of the fourth embodiment, for example, three solid-state imaging devices shown in FIG. 37 are provided. Light having different wavelength range is incident on three pixel columns each including pixel columns 11a, 11a+1, ..., and thereafter, photo-electrical conversion is made. Charge transfer and addition are effected using each of a plurality of analog shift registers 30a, 30a+1, .... Then, the final output signal is output via each buffer 42. In FIG. 42, an alphabet R denotes a solid-state imaging device photo-electrically converting light having a red wavelength range. An alphabet G denotes a solid-state imaging device photo-electrically converting light having a green wavelength range. An alphabet B denotes a solid-state imaging device photo-electrically converting light having a blue wavelength range.

The solid-state imaging device of the sixth embodiment is employed, and thereby, it is possible to realize a color linear image sensor obtaining the same effect as the solid-state imaging device of the fourth embodiment.

In this embodiment, the solid-state imaging device having the configuration shown in FIG. 41 is usable as a solid-state imaging device photo-electrically converting each wavelength light of R, G and B.

Seventh Embodiment

Figure 43:
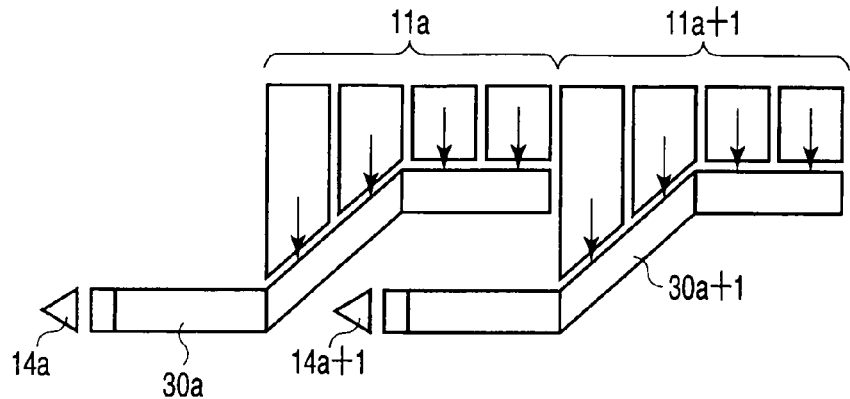
FIG. 43 is a block diagram schematically showing the configuration of a solid-state imaging device according to a seventh embodiment.

FIG. 43 is a block diagram schematically showing the configuration of a solid-state imaging device according to a seventh embodiment. The solid-state imaging device of FIG. 43 is not provided with the shift gate 12 in the solid-state imaging device of the third embodiment. Thus, the same reference numerals are used to designate portions corresponding to FIG. 24, and the explanation is omitted.

Figure 44:
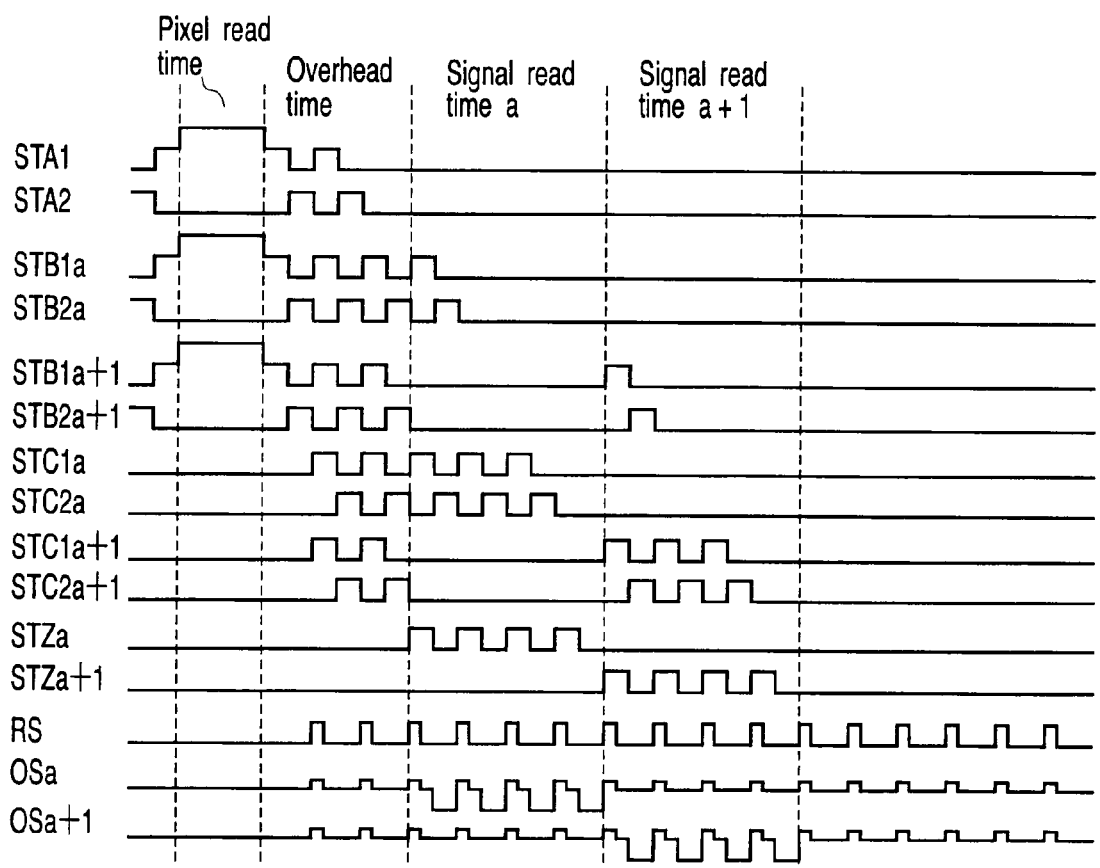
FIG. 44 is a read operation timing chart in the solid-state imaging device shown in FIG. 43.

FIG. 44 is a read operating timing chart in the solid-state imaging device of FIG. 43. As shown in FIG. 24, in the device provided with the shift gate, the shift gate is controlled using the shift pulse signal SH, and thereby, a read operation of signal charges from cell to the analog sift register is made. However, in the solid-state imaging device provided with no shift gate, read from cells is carried out using the analog shift register. For this reason, the amplitude of the drive pulse signal supplied to the transfer stages of the analog shift register must be sufficiently set high. The analog shift register must carry out a charge transfer operation in addition to signal charge read from cells. For this reason, the method of driving the analog shift register must be changed between charge transfer and read from cells. Thus, the amplitude of the drive pulse signal is changed between charge transfer and read from cells.

FIG. 44 is a high resolution read timing chart using no charge addition. In a pixel read time from pixel column, the amplitude of each of drive pulse signals STA1 and STB1 driving the first and second transfer stages of the analog shift register adjacent to the pixel column is set higher to read signal charges from the pixel column. In times other than the pixel read time, the amplitude of all drive pulse signals including drive pulse signals STA1 and STB1 is set lower. In the overhead time, cell signal charges of all pixel columns 11 are transferred to the final transfer of the third transfer stage 30-3 of each analog shift register 30. In the next signal read time a, the signal charge of each cell of the first pixel column 11a is successively transferred to the output unit 14a via the final transfer 30-4. An output from the output unit 14a is fetched as an output signal OS via the buffer 42.

In the next signal read time a+1, the signal charge of each cell of the second pixel column 11a+1 is successively transferred to the output unit 14a+1 via the final transfer 30-4. An output from the output unit 14a+1 is fetched as an output signal OS via the buffer 42.

Although special explanation is not made, even if charges are added, the amplitude of each of drive pulse signals STA1 and STB1 driving the first and second transfer stages of the analog shift register adjacent to the pixel column is set higher in the pixel read time from pixel column. In addition and transfer times, the amplitude is set lower to drive the transfer.

The foregoing fourth to sixth embodiments are applicable to the solid-state imaging device of the seventh embodiment.

In the solid-state imaging device of the seventh embodiment, the analog shift register 30 is divided into some transfer stages (three in this embodiment). The cycle of the drive signal (fifth and sixth drive pulse signals STC1 and STC2) supplied to the third transfer stage 30-3 is changed. In this way, it is possible to readily change the resolution of the read signal.

In addition, when the analog shift register 30 transfers the signal charge, the signal charge is transferred in a horizontal direction to the arrangement direction of the pixel columns. Thus, the electrode length of each transfer electrode of the analog shift register 30 is shortened. Therefore, charges are readily transferred, and thus, this serves to prevent a generation of transfer failure.

In the solid-state imaging device of the seventh embodiment, the shift gate is omitted. Therefore, this serves to simplify the configuration.

The following matters are given as another modification of various embodiments.

(1) Two transfer electrodes forming each transfer of the analog shift register are stacked to be partially overlapped via an insulating film.

(2) Each transfer of the analog shift register is formed of one transfer electrode, and the analog shift register is driven using one-phase drive pulse signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state imaging device comprising:
at least one pixel column having a plurality of photosensitive pixels photo-electrically converting incident light;
at least one shift gate arranged adjacent to the pixel column and configured to control a storage time of a signal charge generated in the photosensitive pixels based on a shift pulse signal;
at least one analog shift register having a plurality of transfer stages each driven according to mutually independent drive signals, and transferring a signal charge of the photosensitive pixels transferred via the shift gate to one direction;
at least one output unit arranged adjacent to an end portion of the analog shift register and configured to detect a signal charge transferred from the analog shift register to convert signal charge into an output signal; and
a control signal generation circuit configured to generate the shift pulse signal and drive signals to control each operation of the shift gate and the analog shift register,
wherein each of the plurality of transfer stages includes:
a first transfer stage to which a plurality of signal charges from the photosensitive pixels is transferred via the shift gate, and successively these signal charges; and
a second transfer stage successively transferring the signal charges transferred from the first transfer stage,
wherein the first transfer stage includes a plurality of first transfer electrodes each supplied with a first drive signal generated in the control signal generation circuit; and a plurality of second transfer electrodes each arranged adjacent to a respective first transfer electrode, and supplied with a second drive signal generated in the control signal generation circuit,
the second transfer stage includes a plurality of third transfer electrodes each supplied with a third drive signal generated in the control signal generation circuit; and a plurality of fourth transfer electrodes each arranged adjacent to respective third transfer electrode, and supplied with a fourth drive signal generated in the control signal generation circuit, and
wherein the first and second transfer stages are configured to receive the first to fourth drive signals, and first and second read modes are controlled with the first to fourth drive signals;
in the first read mode, the first transfer stage successively transfers the signal charges transferred from the photosensitive pixels to the second transfer stage via the shift gate while the second transfer stage successively transfers the signal charges transferred from the first transfer stage to the output unit; and
in the second mode, the first transfer stage successively transfers the signal charges transferred from the photosensitive pixels to the second transfer stage via the shift gate while the second transfer stage successively transfers the signal charges transferred from the first transfer stage to the output unit, and when the signal charges are transferred, the signal charges of pixels are added at a position of one pair of transfer electrodes of the second transfer stage including the third and fourth electrodes existing at a position closest to the first transfer stage.

2. The device according to claim 1, comprising:
a plurality of said pixel columns each having a plurality of photosensitive pixels photo-electrically converting incident light;
a plurality of said shift gates arranged adjacent to respective of the pixel columns, and configured to control a storage time of a signal charge generated in the pixels of the respective plurality of pixel columns based on shift pulse signals;
a plurality of said analog shift registers each having a plurality of transfer stages each driven according to mutually independent drive signals, and transferring signal charges of the plurality of photosensitive pixels of the plurality of pixel columns transferred via the plurality of shift gates to one direction;

a plurality of output units each arranged adjacent to one end portion of a respective of the plurality of analog shift registers, and each detecting a signal charge transferred from the respective of the plurality of analog shift registers to convert the signal charge into an output signal; and the control signal generation circuit generates the shift pulse signals and the drive signals to control each operation of the plurality of shift gates and the plurality of analog shift registers.

3. A solid-state imaging device comprising:

at least one pixel column having a plurality of photosensitive pixels photo-electrically converting incident light;

at least one shift gate arranged adjacent to the pixel column and configured to control a storage time of a signal charge generated in the photosensitive pixels based on a shift pulse signal;

at least one analog shift register having a plurality of transfer stages each driven according to mutually independent drive signals, and transferring a signal charge of the photosensitive pixels transferred via the shift gate to one direction;

at least one output unit arranged adjacent to an end portion of the analog shift register and configured to detect a signal charge transferred from the analog shift register to convert the signal charge into an output signal; and a control signal generation circuit configured to generate the shift pulse signal and drive signals to control each operation of the shift gate and the analog shift register, wherein each of the plurality of transfer stages has a plurality of pairs of transfer electrodes, which are formed on a channel formed on a surface of a semiconductor substrate via an insulating film, and wherein each of the plurality of transfer stages includes:

a first transfer stage to which part of a plurality of signal charges from the photosensitive pixels is transferred via the shift gate, and successively these signal charges;

a second transfer stage to which the remainders of the signal charges from the photosensitive pixels are transferred via the shift gate and to which the signal charges are successively transferred from the first transfer stage, and successively transferring the signal charges; and a third transfer stage successively transferring the signal charges transferred from the second transfer stage.

4. The device according to claim 3, wherein the first transfer stage includes: a plurality of first transfer electrodes each supplied with a first drive signal generated in the control signal generation circuit; and a plurality of second transfer electrodes each arranged adjacent to a respective of the first transfer electrode, and supplied with a second drive signal generated in the control signal generation circuit, the second transfer stage includes: a plurality of third transfer electrodes each supplied with a third drive signal generated in the control signal generation circuit; and a plurality of fourth transfer electrodes each arranged adjacent to a respective of the third transfer electrode, and supplied with a fourth drive signal generated in the control signal generation circuit, and the third transfer stage includes: a plurality of fifth transfer electrodes each supplied with a fifth drive signal generated in the control signal generation circuit; and a plurality of sixth transfer electrodes each arranged adjacent to a respective of the fifth transfer electrode, and supplied with a sixth drive signal generated in the control signal generation circuit.

5. The device according to claim 4, wherein the first, second and third transfer stages are configured to receive the first to sixth drive signals, and a first and second read modes are controlled with the first to sixth drive signals;

in the first read mode, the first transfer stage successively transfers the part of the signal charges transferred via the shift gate to the second transfer stage, and the second transfer stage successively transfers the remainders of the signal charges transferred via the shift gate and the signal charges transferred from the first transfer stage to the third transfer stage, and the third transfer stage successively transfers the signal charges transferred from the second transfer stage to the output unit;

in the second read mode, the first transfer stage successively transfers the part of the signal charges transferred via the shift gate to the second transfer stage, and the second transfer stage successively transfers the remainders of the signal charges transferred via the shift gate and the signal charges transferred from the first transfer stage to the third transfer stage, and the third transfer stage successively transfers the signal charges transferred from the second transfer stage to the output unit, and further, when the signal charges are transferred, the signal charges of pixels are added at a position of one pair of transfer electrodes of the third transfer stage including the fifth and sixth electrodes existing at a position closest to the second transfer stage.

6. The device according to claim 3, comprising:

a plurality of said pixel columns each having a plurality of photosensitive pixels photo-electrically converting incident light;

a plurality of said shift gates arranged adjacent to respective of the plurality of pixel columns and configured to control a storage time of a signal charge generated in the pixels of the respective of the plurality of pixel columns based on shift pulse signals;

a plurality of said analog shift registers each having a plurality of transfer stages each driven according to mutually independent drive signals, and configured to transfer signal charges of the plurality of photosensitive pixels of respective of the plurality of pixel columns transferred via the plurality of shift gates to one direction;

a plurality of said output units arranged adjacent to one end portion of a respective of the plurality of analog shift registers, and each configured to detect a signal charge transferred from the respective analog shift register to convert the signal charge into an output signal; and the control signal generation circuit configured to generate the shift pulse signals and the drive signals to control each operation of the plurality of shift gates and the plurality of analog shift registers.

7. The device according to claim 6, further comprising:

a buffer outputting output signals converted by the plurality of output units; and a plurality of output select transistors each interposed between the plurality of output units and the buffer, and controlled to selectively turn on based on control signals.

8. The device according to claim 6, wherein the first transfer stage includes a plurality of first transfer electrodes each supplied with a first drive signal generated in the control signal generation circuit; and a plurality of second transfer electrodes each arranged adjacent to a respective first transfer electrode, and supplied with a second drive signal generated in the control signal generation circuit;

the second transfer stage includes a plurality of third transfer electrodes each supplied with a third drive signal generated in the control signal generation circuit; and a plurality of fourth transfer electrodes each arranged adjacent to a respective third transfer electrode, and supplied with a fourth drive signal generated in the control signal generation circuit; and the third transfer stage includes a plurality of fifth transfer electrodes each supplied with a fifth drive signal generated in the control signal generation circuit; and a plurality of sixth transfer electrodes each arranged adjacent to a respective fifth transfer electrode, and supplied with a sixth drive signal generated in the control signal generation circuit.

9. The device according to claim 8, wherein the first, second and third transfer stages receive the first to sixth drive signals, and first and second read modes are controlled with the first to sixth drive signals;

in the first read mode, the first transfer stage successively transfers the part of the signal charges transferred via the shift gate to the second transfer stage, and the second transfer stage successively transfers the remainders of the signal charges transferred via the shift gate and the signal charges transferred from the first transfer stage to the third transfer stage, and the third transfer stage successively transfers the signal charges transferred from the second transfer stage to the output unit;

in the second read mode, the first transfer stage successively transfers the part of the signal charges transferred via the shift gate to the second transfer stage, and the second transfer stage successively transfers the remainders of the signal charges transferred via the shift gate and the signal charges transferred from the first transfer stage to the third transfer stage, and the third transfer stage successively transfers the signal charges transferred from the second transfer stage to the output unit, and further, when the signal charges are transferred, the signal charges of pixels are added at a position of one pair of transfer electrodes of the third transfer stage including the fifth and sixth electrodes existing at a position closest to the second transfer stage.

10. The device according to claim 6, wherein the plurality of pixel columns are arrayed in a state of being arranged at upper and lower sides, the plurality of pixels of the pixel columns arrayed on the upper side is arrayed in a state of being shifted by ½ of each pixel pitch or by a value close to ½ with respect to the plurality of pixels of the pixel columns arrayed on the lower side, the pixels of the pixel columns arrayed at the upper and lower two lines are arrayed in a shape of zigzag as a whole.

11. The device according to claim 10, further comprising:
a buffer outputting an output signal converted by the plurality of output units;

a plurality of first output select transistors interposed in parallel between the plurality of output units of the plurality of the pixel columns arrayed on the lower side and the buffer, and further, controlled to selectively turn on based on first control signals;

a plurality of second output select transistors interposed in parallel between the plurality of output units of the plurality of the pixel columns arrayed on the upper side and the buffer, and further, controlled to selectively turn on based on second control signals;

a third output select transistor interposed in series between the plurality of first transistors and the buffer; and a fourth output select transistor interposed in series between the plurality of second transistors and the buffer, and controlled to alternately turn on with the third output select transistor.

12. A method of driving a solid-state imaging device having a plurality of pixel columns each including photosensitive pixels photo-electrically converting incident light, a plurality of shift gates, a plurality of analog shift registers each including a plurality of transfer stages, and an output unit detecting a signal charge transferred from each of the analog shift registers, comprising:

transferring signal charges generated in the plurality of pixel columns to a first transfer stage of each of the plurality of analog shift registers;

simultaneously driving the first transfer stage and successively transferring the signal charges in the first transfer stage;

in a first read mode, driving a transfer stage after the first transfer stage of one of the analog shift registers, successively transferring the signal charges to a transfer electrode of the final transfer stage of the corresponding one analog shift register, successively detecting the signal charges by the corresponding output unit of the output units, and outputting an output signal, and further, successively driving a transfer stage after the first transfer stage of the remainder of the analog shift registers, successively transferring the signal charges successively to a transfer electrode of the final transfer stage of the corresponding analog shift register, and successively detecting the signal charges by the corresponding output unit, and outputting an output signal; and in a second read mode, driving a transfer stage after the first transfer stage of the analog shift registers using a drive signal having a cycle of 1/L (L is a natural number more than 2) with respect to a drive signal for driving each first transfer stage to add the signal charges while transferring them, and thereafter, transferring the added signal charges to a transfer electrode of the final transfer stage of the corresponding each analog shift register, and thereafter, successively detecting the added signal charges by the corresponding output unit of the output units, and outputting an output signal.

* * * * *